(12) United States Patent
Yoshimura et al.

(10) Patent No.: US 9,869,761 B2
(45) Date of Patent: Jan. 16, 2018

(54) RADAR APPARATUS

(71) Applicant: FUJITSU TEN LIMITED, Kobe-shi, Hyogo (JP)

(72) Inventors: Keishi Yoshimura, Kobe (JP); Hiroyuki Ishimori, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 503 days.

(21) Appl. No.: 14/564,599

(22) Filed: Dec. 9, 2014

(65) Prior Publication Data

US 2015/0204971 A1    Jul. 23, 2015

(30) Foreign Application Priority Data

Jan. 22, 2014  (JP) ................. 2014-009227

(51) Int. Cl.

| G01S 13/06 | (2006.01) |
|---|---|
| B60W 30/00 | (2006.01) |
| G01S 13/34 | (2006.01) |
| G01S 13/42 | (2006.01) |
| G01S 13/58 | (2006.01) |
| G01S 13/93 | (2006.01) |

(52) U.S. Cl.
CPC ............. *G01S 13/06* (2013.01); *B60W 30/00* (2013.01); *G01S 13/345* (2013.01); *G01S 13/42* (2013.01); *G01S 13/584* (2013.01); *G01S 13/931* (2013.01); *G01S 2013/9353* (2013.01); *G01S 2013/9375* (2013.01)

(58) Field of Classification Search
CPC ........ G01S 13/06; G01S 13/345; G01S 13/42; G01S 13/584; G01S 13/931; G01S 2013/9353; G01S 2013/9375; B60W 30/00

See application file for complete search history.

(56) References Cited

U.S. PATENT DOCUMENTS 6,661,370 B2 * 12/2003 Kishida ................. G01S 13/345
                                                            342/104
6,690,319 B2 *  2/2004 Matsui ................... G01S 13/345
                                                             342/70

(Continued)

FOREIGN PATENT DOCUMENTS

JP      A-8-262130         10/1996
JP      3383819 B2  *      3/2003

(Continued)

*Primary Examiner* — Matthew M Barker
(74) *Attorney, Agent, or Firm* — Oliff PLC

(57) ABSTRACT

A radar apparatus includes a signal processor configured to: (i) in a case where a first angle peak signal closest to a prediction position in an up period and a second angle peak signal closest to the prediction position in a down period satisfy a pairing condition, finalize a combination of the first angle peak signal and the second angle peak signal as a pair data set; and (ii) in a case where the combination of the first angle peak signal and the second angle peak signal does not satisfy the pairing condition, where the plurality of angle peak signals exist in the prediction region in at least one of the up period and the down period and where a different combination from the combination of the first angle peak signal and the second angle peak signal satisfies a re-pairing condition, finalize the different combination as the pair data set.

13 Claims, 30 Drawing Sheets

(56) References Cited

U.S. PATENT DOCUMENTS

| | | | | |
|---|---|---|---|---|
| 6,741,204 B2* | 5/2004 | Kumon | G01S 7/35 | 342/192 |
| 6,856,278 B2* | 2/2005 | Nakanishi | G01S 13/345 | 342/118 |
| 6,888,494 B2* | 5/2005 | Tamatsu | G01S 13/345 | 342/109 |
| 6,900,754 B2* | 5/2005 | Ono | G01S 13/345 | 342/118 |
| 6,924,762 B2* | 8/2005 | Miyake | G01S 13/34 | 342/109 |
| 6,970,129 B2* | 11/2005 | Kumon | G01S 13/345 | 342/109 |
| 6,999,024 B2* | 2/2006 | Kumon | G01S 7/41 | 342/192 |
| 7,271,761 B2* | 9/2007 | Natsume | G01S 13/34 | 342/118 |
| 7,312,745 B2* | 12/2007 | Ishii | G01S 13/584 | 342/109 |
| 7,567,204 B2* | 7/2009 | Sakamoto | G01S 7/354 | 342/118 |
| 7,755,537 B2* | 7/2010 | Shimizu | G01S 7/4026 | 342/147 |
| 8,149,158 B2* | 4/2012 | Samukawa | G01S 13/345 | 342/105 |
| 8,552,907 B2* | 10/2013 | Kanamoto | G01S 3/74 | 342/147 |
| 8,866,668 B2* | 10/2014 | Kitagawa | G01S 7/354 | 342/104 |
| 2012/0112951 A1* | 5/2012 | Nakanishi | G01S 13/931 | 342/107 |
| 2013/0307718 A1* | 11/2013 | Aoki | G01S 13/50 | 342/61 |
| 2013/0321195 A1* | 12/2013 | Moriuchi | G01S 13/52 | 342/70 |
| 2015/0378008 A1* | 12/2015 | Ookawa | G01S 13/34 | 342/194 |

FOREIGN PATENT DOCUMENTS

| | | |
|---|---|---|
| JP | 2007-253714 A | 10/2007 |
| JP | 2010-096589 A | 4/2010 |
| JP | A-2010-96589 | 4/2010 |
| JP | 2012-103118 A | 5/2012 |
| JP | A-2012-220196 | 11/2012 |
| JP | 2013-200255 A | 10/2013 |

* cited by examiner

RADAR APPARATUS

BACKGROUND OF THE INVENTION

Field of the Invention

The invention relates to a signal process that is used to derive a position of a target.

Description of the Background Art

Conventionally, a radar apparatus mounted on a vehicle sends a transmission wave from a transmitting antenna and a receiving antenna of the radar apparatus receives a reflection wave that is the transmission wave reflected at a point on an object (hereinafter referred to as "target"). Accordingly, the radar apparatus derives information of the target (hereinafter referred to as "target information"), including a position of the target relative to the vehicle.

Concretely, the radar apparatus generates a beat signal by mixing a reception signal and a transmission signal of which a frequency changes in a predetermined cycle. Then the radar apparatus processes the beat signal by using fast Fourier transform (FFT) to generate a frequency spectrum. A signal exceeding a predetermined threshold (hereinafter referred to as "frequency peak signal") is extracted in each of an up period and a down period in the frequency spectrum. The up period is a period in which a cyclically-changing frequency of a transmission signal increases, and a down period is a period in which the cyclically-changing frequency of the transmission signal decreases. Then the radar apparatus performs pairing that pairs the frequency peak signal in the up period and the frequency peak signal in the down period based on a predetermined condition and finalizes a pair data set. The radar apparatus derives a filtered data set obtained by filtering the pair data set finalized in the current process and the pair data set in a previous process, at a predetermined percentage. The two pair data sets to be filtered have the highest possibility of being associated with a same reflection point.

Next, the radar apparatus derives a prediction peak signal based on the derived filtered data set. The prediction peak signal is a prediction of the frequency peak signal in each of the up period and the down period to be processed in a next process. The prediction peak signal includes parameters such as a prediction frequency and a prediction angle. In other words, the prediction peak signal represents a prediction position of the target that will be derived in the next process.

Based on the prediction frequency of the prediction peak signal, the radar apparatus extracts the frequency peak signal, in each of the up period and the down period, that has time continuity with the filtered data set (hereinafter referred to as "history peak signal").

Moreover, the radar apparatus performs a process of calculating azimuth directions of the history peak signals in the up period and in the down period. As a result of the process of calculating the azimuth direction, an angle spectrum is derived. The radar apparatus derives a peak signal exceeding a predetermined threshold (hereinafter referred to as "angle peak signal") in each of the up period and the down period in the angle spectrum. For example, three or less angle peak signals are derived from one history peak signal.

The radar apparatus performs a process of pairing the angle peak signal in the up period and the angle peak signal in the down period based on a prediction angle of the prediction peak signal. Concretely, the radar apparatus selects an angle peak signal that has an angle closest to the prediction angle in each of the up period and the down period, as a candidate for a combination. Then, in a case where a signal level difference between the candidate angle peak signals for the combination is equal to or less than a predetermined value, the radar apparatus finalizes the combination of those angle peak signals as a pair of the angle peak signals associated with a same reflection point with which a target data set derived in a past process is associated (hereinafter referred to as "history pair data set").

Based on the filtered data obtained by filtering, at the predetermined percentage, the history pair data set and the target data set derived in the past process that is associated with the same reflection point as the history pair data set, the radar apparatus derives a distance from the vehicle to the target, an angle of the target to the vehicle and a relative speed of the target to the vehicle. The radar apparatus outputs to a vehicle controller a position and the relative speed of the target. Accordingly, the vehicle controller performs necessary vehicle control depending on the position and the relative speed of the target.

However, in the process of pairing the angle peak signals in the up period and the down period, in a case where the signal level difference between the angle peak signals exceeds the predetermined value, the radar apparatus does not finalize the combination of the peak signals as the history pair data set because in the case where the signal level difference between the angle peak signals in the up period and the down period in the pair exceeds the predetermined value, there is a high possibility that the angle peak signals in the combination are associated with different reflection points.

Herein, although the angle peak signals closest to the prediction angle in the periods are paired, a reason why the signal level difference exceeds the predetermined value is because the reflection wave of the angle peak signal in the up period is reflected at a different reflection point from a reflection point at which the reflection wave of the angle peak in the down period.

There is a time difference of some msec. between when the radar apparatus receives the reflection wave corresponding to the angle peak signal in the up period and when the radar apparatus receives the reflection wave corresponding to the angle peak signal in the down period. For the some msec., at least one of the vehicle and the target travels so that a position of the target to the vehicle is changed. Therefore, the reflection waves corresponding to the angle peak signals in the up period and in the down period are reflected at different reflection points. Moreover, the radar apparatus receives the reflection waves reflected at plural reflection points on a vehicle traveling in front of a host vehicle in a traffic lane (hereinafter referred to as "front vehicle") in which the host vehicle is traveling. In a case where number of the plural reflection points exceeds a maximum number that the radar apparatus can calculate the azimuth directions of the angle peak signals, a slight difference is caused between angles of the angle peak signals derived by the radar apparatus and an actual angles of the targets.

In a case where the radar apparatus cannot derive the history pair data set, the radar apparatus derives a prediction data set that is a history pair data set predicted based on the target data set derived in the previous process. Then the radar apparatus performs a process of replacing the prediction data set with the history pair data set (hereinafter referred to as extrapolation process"). However, the extrapolation process is performed based on the prediction data set, not based on an actually derived data set. Therefore, a derived position of the target may be different from an actual position so that the vehicle controller that controls the vehicle may not perform proper control in a case where the vehicle controller performs the vehicle control by obtaining position information of the target output from the radar apparatus.

SUMMARY OF THE INVENTION

According to one aspect of the invention, a radar apparatus is installed on a vehicle and is configured to receive a reflection wave reflected by a target and to derive a position of the target. The radar apparatus includes a signal processor configured to: derive a prediction peak signal in each of an up period in which a frequency of a transmission signal increases and in a down period in which the frequency of the transmission signal decreases, the frequency of the transmission signal changing in a predetermined cycle; set a prediction region having a predetermined range defined based on a prediction position of an angle peak signal, in each of the up period and the down period based on the prediction peak signal; determine whether or not a plurality of the angle peak signals exist in the prediction region in at least one of the up period and the down period; and (i) in a case where a first angle peak signal closest to the prediction position in the up period and a second angle peak signal closest to the prediction position in the down period satisfy a pairing condition, finalize a combination of the first angle peak signal and the second angle peak signal as a pair data set, and (ii) in a case where the combination of the first angle peak signal and the second angle peak signal does not satisfy the pairing condition, where the plurality of angle peak signals exist in the prediction region in at least one of the up period and the down period and where a different combination from the combination of the first angle peak signal and the second angle peak signal satisfies a re-pairing condition, finalize the different combination as the pair data set. Even in a case where the plurality of target data sets in the prediction region, the radar apparatus can finalize a combination of the angle peak signals having the highest possibility to be associated with a same reflection point, as the history pair data set. Thus, use of the extrapolation process can be reduced and an actual position of the target can be derived.

Moreover, according to another aspect of the invention, the signal processor is further configured to: determine whether or not the combination of the angle peak signals exists in a short distance range that is a range in a relatively short distance from the vehicle, in a current traffic lane region that is a range of a current traffic lane in which the vehicle is traveling, and wherein in a case where the combination of the angle peak signals exists in the current traffic lane region, the signal processor finalizes the different combination as the pair data set. The radar apparatus can reduce processing load caused by derivation of target information and can prevent from finalizing a wrong combination of an angle peak signal in the current traffic lane and an angle peak signal in a next traffic lane, as the pair data set. Therefore, an object of the invention is to provide a technology that minimizes the extrapolation process and that finalizes a combination of the angle peak signals having the highest possibility to be associated with a same reflection point, as a history pair data set.

These and other objects, features, aspects and advantages of the invention will become more apparent from the following detailed description of the invention when taken in conjunction with the accompanying drawings.

DESCRIPTION OF THE EMBODIMENTS

Embodiments of the invention are hereinafter explained with reference to the drawings.

<1. System Block Diagram>

<1-1. Entire Structure>

Figure 1:
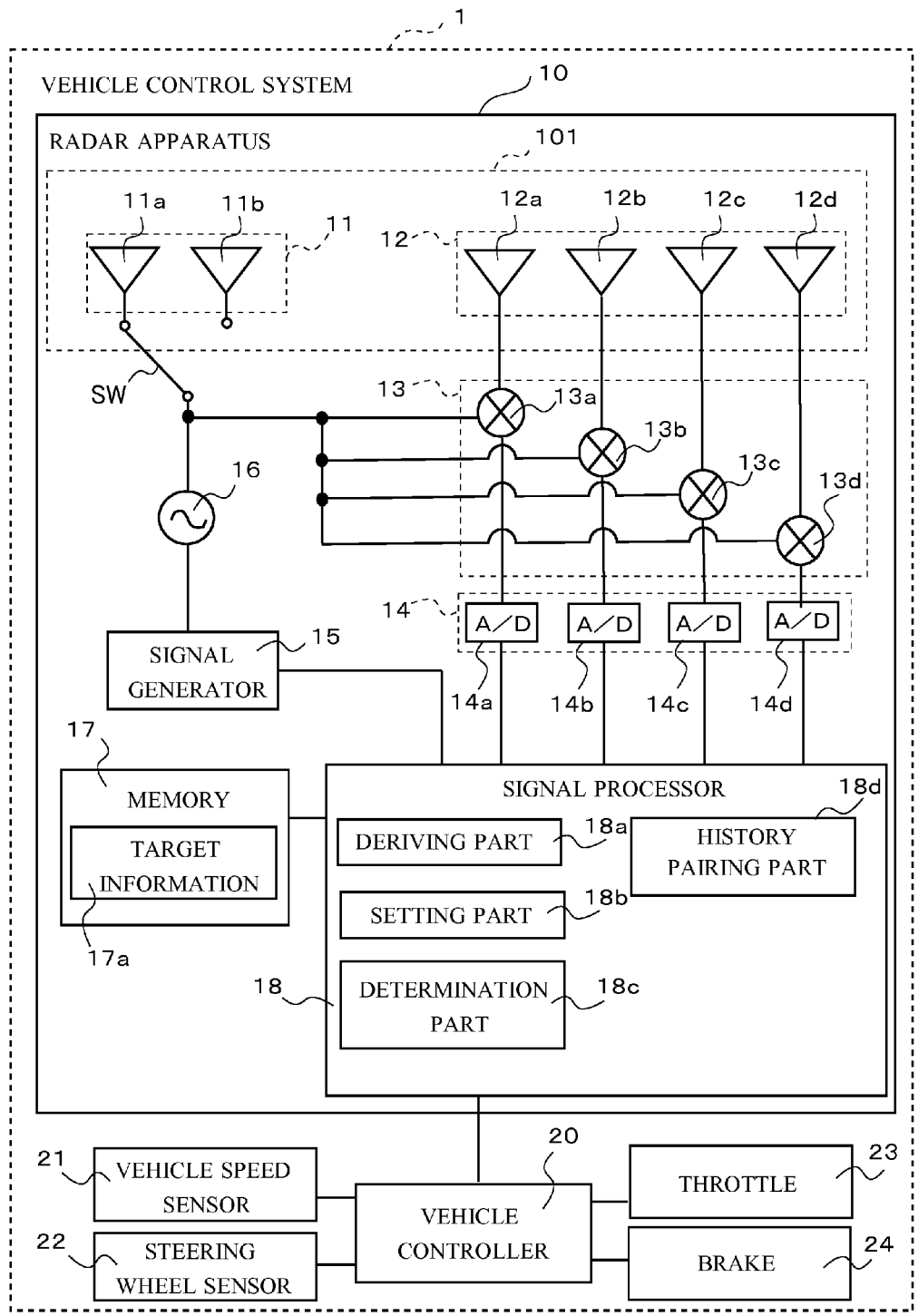
FIG. 1 is a block diagram of a vehicle control system of a first embodiment.

FIG. 1 is a block diagram of a vehicle control system 1. The vehicle control system 1 controls running of a host vehicle and includes a radar apparatus 10, a vehicle controller 20, a vehicle speed sensor 21, a steering wheel sensor 22, a throttle 23 and a brake 24. The radar apparatus 10 is electrically connected to the vehicle controller 20. The vehicle controller 20 is electrically connected to the vehicle speed sensor 21, the steering wheel sensor 22, the throttle 23 and the brake 24.

The vehicle controller 20 performs vehicle control based on information of a target (target information) including a position and a relative speed of the target obtained from the radar apparatus 10. For example, the vehicle controller 20 performs adaptive cruise control (ACC) to follow a front vehicle based on the target information of the front vehicle, keeping an inter-vehicular distance between the host vehicle and the front vehicle at a predetermined distance.

The vehicle speed sensor 21 outputs to the vehicle controller 20 a signal corresponding to a speed of the host vehicle based on rotations of an axle of the host vehicle. The vehicle controller 20 derives a current speed of the host vehicle based on the signal output from the vehicle speed sensor 21.

The steering wheel sensor 22 derives a rotated angle of a steering wheel rotated by a driver of the host vehicle and then outputs information of the rotated angle to the vehicle controller 20. The vehicle controller 20 derives a value of a curve radius of a current traffic lane in which the host vehicle is currently traveling, based on the information obtained from the steering wheel sensor 22.

The throttle 23 increases the speed of the host vehicle based on an operation of the driver of the host vehicle. Moreover, the throttle 23 increases the speed of the host vehicle based on control performed by the vehicle controller 20. For example, during ACC, the throttle 23 increases the speed of the host vehicle to keep a distance between the host vehicle and the front vehicle traveling in front of the host vehicle in the current traffic lane at a constant value.

The brake 24 decreases the speed of the host vehicle based on an operation of the driver of the host vehicle. Moreover, the brake 24 decreases the speed of the host vehicle based on the control performed by the vehicle controller 20. For example, during ACC, the throttle 23 decreases the speed of the host vehicle to keep the distance between the host vehicle and the front vehicle traveling in front of the host vehicle in the current traffic lane at the constant value.

Next, the radar apparatus 10 is explained. The radar apparatus 10 includes an antenna 101, a mixer 13 (including 13a to 13d), an analog-to-digital (AD) converter 14 (including 14a to 14d), a signal generator 15, an oscillator 16, a switch SW, a memory 17, and a signal processor 18.

The antenna 101 includes a transmitting antenna 11 and a receiving antenna 12. The transmitting antenna 11 includes a transmitting antenna 11a and a transmitting antenna 11b. The transmitting antenna 11a and the transmitting antenna 11b are switched to each other in a predetermined cycle. Thus, at least one of the two transmitting antennas outputs a transmission wave.

The receiving antenna 12 includes four receiving antennas 12a, 12b, 12c and 12d. The four receiving antennas receive reflection waves reflected by the target and output reception signals of the received waves to the mixers 13.

<1-2. Transmission Range>

Figure 2:
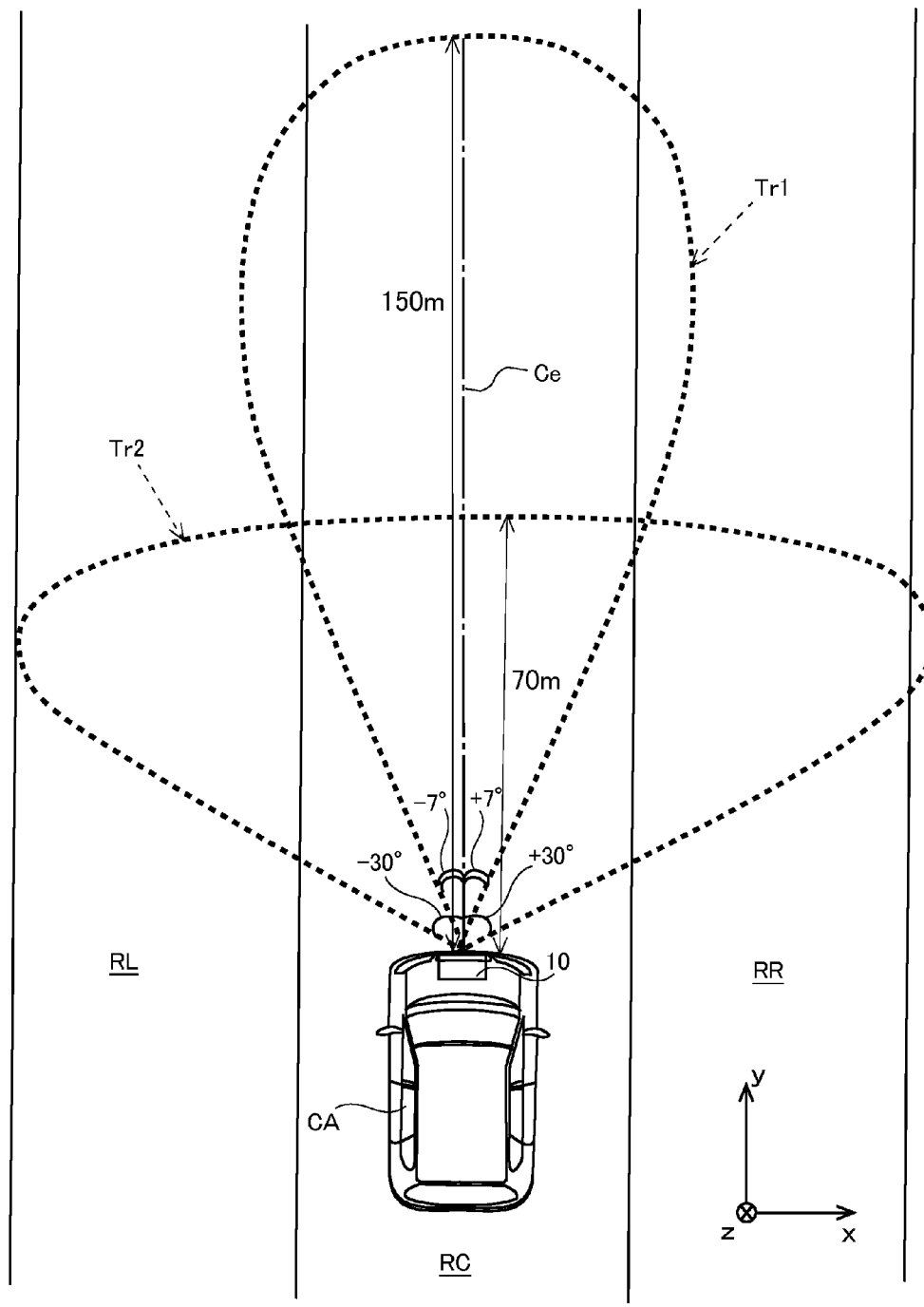
FIG. 2 shows a transmission ranges of transmission waves from transmitting antennas.

Transmission ranges of the transmitting antenna 11a and the transmitting antenna 11b are explained with reference to FIG. 2. FIG. 2 shows the transmission ranges of the transmission waves from the transmitting antenna 11a and the transmitting antenna 11b. Directions are described by x, y and z coordinate axes in FIG. 2. The x, y and z coordinate axes are fixed relative to a host vehicle CA (hereinafter referred to as "vehicle CA"). The x axis corresponds to a width direction of the vehicle CA, and the y axis corresponds to a traveling direction of the vehicle CA. Moreover, the z axis corresponds to a height direction (direction showing a height of a vehicle) of the vehicle CA. FIG. 2 illustrates a view looked downward (−z side) from a point above (+z side) the vehicle CA in the height direction (z-axis direction).

A transmission range Tr1 shows a reach of the transmission wave output from the transmitting antenna 11a. A transmission axis Ce running in a substantial center of the transmission range Tr1 shows a transmission direction of the transmission wave. Given that the transmission axis Ce is ±0 degree, a horizontal angle of the transmission range Tr1 is approx. ±7 degrees, i.e. approx. 14 degrees, to the transmission axis Ce. Moreover, a transmission distance of the transmission wave is approx. 150 m. In a case where the vehicle CA is located substantially in a center of a current traffic lane RC, a horizontal angle range of the transmission range Tr1 includes a width (approx. 3.6 m) of the current traffic lane RC.

A transmission range Tr2 shows a reach of the transmission wave output from the transmitting antenna 11b. Given that the transmission axis Ce is ±0 degree, a horizontal angle of the transmission range Tr2 is approx. ±30 degrees, i.e. approx. 60 degrees, to the transmission axis Ce. Moreover, a transmission distance of the transmission wave is approx. 70 m. In a case where the vehicle CA is located substantially in the center of the current traffic lane RC, a horizontal angle range of the transmission range Tr2 includes a width (approx. 10.8 m) of the current traffic lane RC, a left traffic lane RL that is a traffic lane left to the current traffic lane RC and a right traffic lane RR that is a traffic lane right to the current traffic lane RC.

The transmission waves output from the transmitting antenna 11b are used to properly derive an azimuth direction of the target in azimuth direction calculation of the target, described later, even if a phase ghost occurs. Herein, the term "phase ghost" refers to a phenomenon in which an angle different from a true angle of the target is derived due to a 360-degree rotation of a phase of the reflection wave from the target. Even in a case where the phase ghost occurs, the radar apparatus 10 derives an accurate angle of the target based on a difference in reception levels of two reflection waves, one of which is the transmission wave reflected by the target after being transmitted to the transmission range Tr1 and the other of which is the transmission wave reflected by the target after being transmitted to the transmission range Tr2.

In reference back to FIG. 1, the mixer 13 includes the four mixers 13a, 13b, 13c and 13d. Each of the four mixers is electrically connected to each of the receiving antennas and all of the four receiving antennas are electrically connected to the mixer 13. The mixer 13 mixes the reception signal corresponding to the reflection wave received by the receiving antenna 12 with a transmission signal corresponding to the transmission wave. In other words, the mixer 13 derives a beat signal that is a signal of a difference between the reception signal and the transmission signal. The derived beat signal is outputs to the AD converter 14.

The AD converter 14 includes the four AD converters 14a, 14b, 14c and 14d. Each of the four AD converters is electrically connected to each of the receiving antennas via the mixer, and all of the four receiving antennas are electrically connected to the AD converters via the mixer. The AD converter 14 converts an analogue signal input from the mixer 13 into a digital signal. Concretely, the AD converter 14 samples an analogue beat signal in a predetermined cycle. Then, the AD converter 14 quantizes and converts the sampled analogue beat signal into a digital beat signal, and outputs the converted digital beat signal to the signal processor 18.

The signal generator 15 generates and outputs a triangular wave signal for modulation to the oscillator 16. The oscillator 16 modulates frequencies of a millimeter wave signal (e.g. 76.5 GHz) to convert the signal into a triangular wave signal and outputs the triangular wave signal to the transmitting antenna 11 via the switch SW.

The switch SW electrically connects one of the transmitting antenna 11a and the transmitting antenna 11b to the oscillator 16. In other words, the switch SW switches connection to the oscillator 16 between one of the two transmitting antennas (e.g. the transmitting antenna 11a) and the other antenna (e.g. the transmitting antenna 11b). The switch SW switches the connection, for example, for every 5 msec.

<1-3. Explanation of Each Signal>

Figure 3:
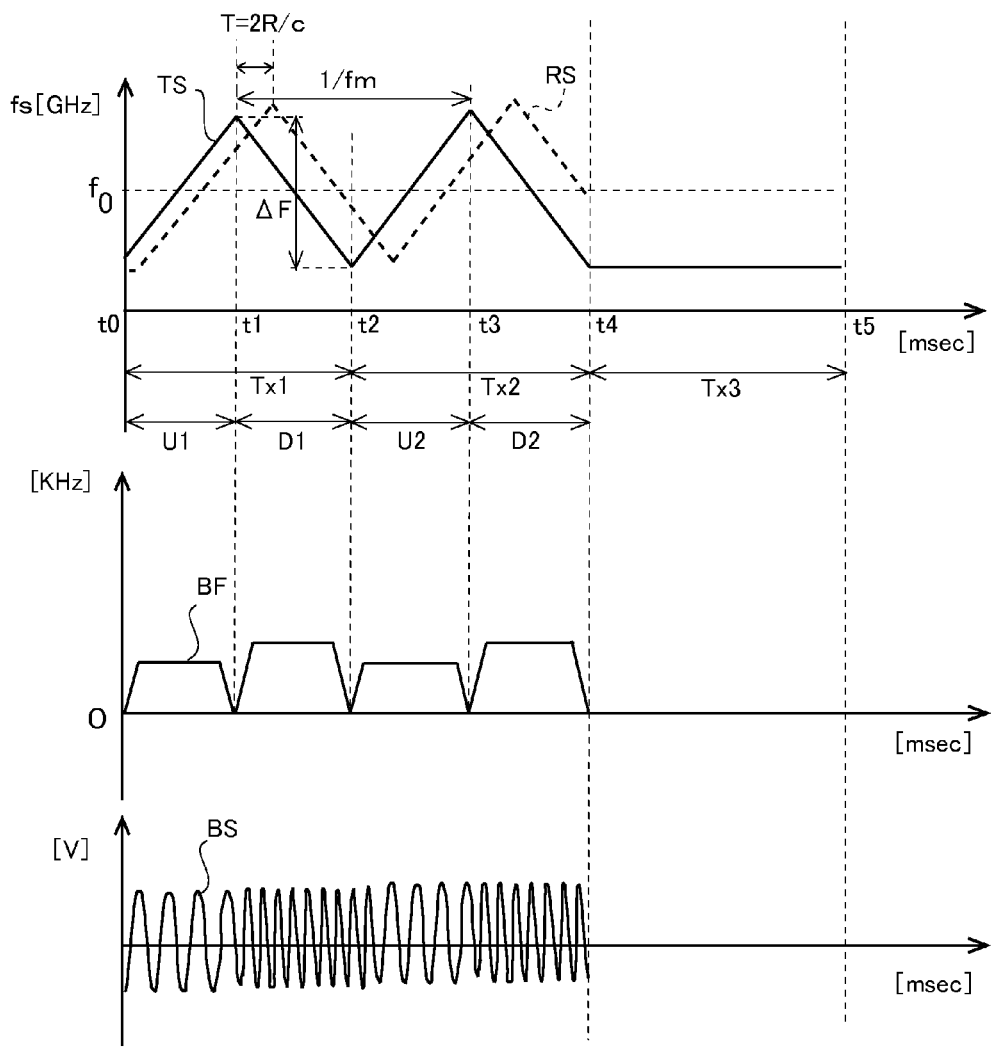
FIG. 3 illustrates a beat signal derived based on a transmission signal and a reception signal.

Next, the transmission signal, the reception signal and the beat signal mentioned above are explained with reference to the drawings. FIG. 3 illustrates a beat signal BS derived based on a transmission signal TS and a reception signal RS. The following are represented by symbols in FIG. 3 and the mathematical formulas explained below. A center frequency of the transmission wave is represented as $F_0$. A frequency shift range is represented as $\Delta F$. A multiplicative inverse of one cycle in which a frequency goes up and down is represented as $f_m$. A light speed (a speed of a radio wave) is represented as c. A travel time for the radio wave to make a round trip between the vehicle CA and the target is represented as T. A transmission frequency or a reception frequency is represented as $f_s$. A distance is represented as R and a relative speed is represented as V.

An upper chart in FIG. 3 shows signal waveforms of the transmission signal TS and the reception signal RS. A middle chart in FIG. 3 shows beat frequencies caused by frequency differences between the transmission signal TS and the reception signal RS. A bottom chart in FIG. 3 shows the beat signal BS corresponding to a signal level of the beat frequency.

A longitudinal axis and a horizontal axis of the upper chart in FIG. 3 represent frequency [GHz] and time [msec.], respectively. The transmission signal TS in the upper chart repeats a change in a range of 200 MHz in a specific pattern in which the transmission signal TS goes up to a first frequency (e.g. 76.6 GHz) and goes down to a second frequency (e.g. 76.4 GHz) with the center frequency of $f_0$ (e.g. 76.5 GHz).

The transmission signal TS has a period in which a frequency of the transmission signal TS goes up to the first frequency (hereinafter referred to as "up period"). For example, a period U1 (a time period from t0 to t1) and a period U2 (a time period from t2 to t3) are the up periods.

Moreover, the transmission signal TS has a period in which the frequency of the transmission signal TS goes down to the second frequency (hereinafter referred to as "down period"). For example, a period D1 (a time period from the t1 to the t2) and a period D2 (a time period from the t3 to t4) are the down periods. Further, a first transmission period Tx1 (a time period from the t0 to the t2) is a period when the transmitting antenna 11a transmits the transmission wave and a second transmission period Tx2 (a time period from the t2 to the t4) is a period when the transmitting antenna 11b transmits the transmission wave.

A signal processing period Tx3 (a time period from the t4 to t5) is a period when the signal processor 18 derives the target information based on the transmission signal TS and the reception signal RS. Like the transmission signal TS, the reception signal RS also has an up period in which the frequency goes up and a down period in which the frequency goes down.

There is a time difference between when the transmitting antenna 11 transmits the transmission wave and when the receiving antenna 12 receives the reflection wave of the transmission wave reflected by the target, depending on a distance from the vehicle CA to the target. In other words, there is a time difference (time T) between when the transmission wave is output after the radar apparatus 10 generates the transmission signal TS and when the reception signal RS is generated after the radar apparatus 10 receives the reflection wave. Moreover, in a case where a speed of the vehicle CA is different from a speed of the target, a frequency difference between the transmission signal TS and the reception signal RS is caused by the difference between the speeds.

A longitudinal axis and a horizontal axis of the middle chart in FIG. 3 represent frequency [kHz] and time [msec.], respectively. A beat frequency BF in the chart represents differences between the transmission signal TS and the reception signal RS in the up periods and also between the transmission signal TS and the reception signal RS in the down periods.

A longitudinal axis and a horizontal axis of the bottom chart in FIG. 3 represent amplitude [V] and time [msec.], respectively. The beat signal BS in the chart represents variations of the frequency and the amplitude at each time point. The analogue beat signal BS is converted to a digital beat signal by the AD converter 14.

With reference back to FIG. 1, the memory 17 stores an execution program for various arithmetic processing performed by the signal processor 18. Moreover, the memory 17 stores plural target information derived by the signal processor 18. The memory 17 stores, for example, target information 17a derived in a previous process and a current process. The previous process and the current process are temporally consecutive processes. The target information 17a includes a position and the speed of the target. Position information includes the distance from the target to a point where the receiving antenna 12 receives the reflection wave reflected by the target (hereinafter referred to as "longitudinal distance") and also a distance from the target to the transmission axis Ce in a lateral direction (vehicle width direction) (hereinafter referred to as "lateral distance"). The lateral distance is derived by the signal processor 18 that calculates an angle of the target, using trigonometric functions. Moreover, the speed includes an absolute speed and the relative speed of the target to the vehicle CA.

The signal processor 18 derives the target information based on the foregoing beat signal BS derived based on the transmission signal TS and the reception signal RS. The signal processor 18 includes a deriving part 18a, a setting part 18b, a determination part 18c and a history pairing part 18d and performs various functions. With reference to process flowcharts in FIG. 4 and FIG. 5, the various functions performed by the signal processor 18 are hereinafter explained.

<2. Process Flowcharts>
<2-1. Entire Process>

Figure 4:
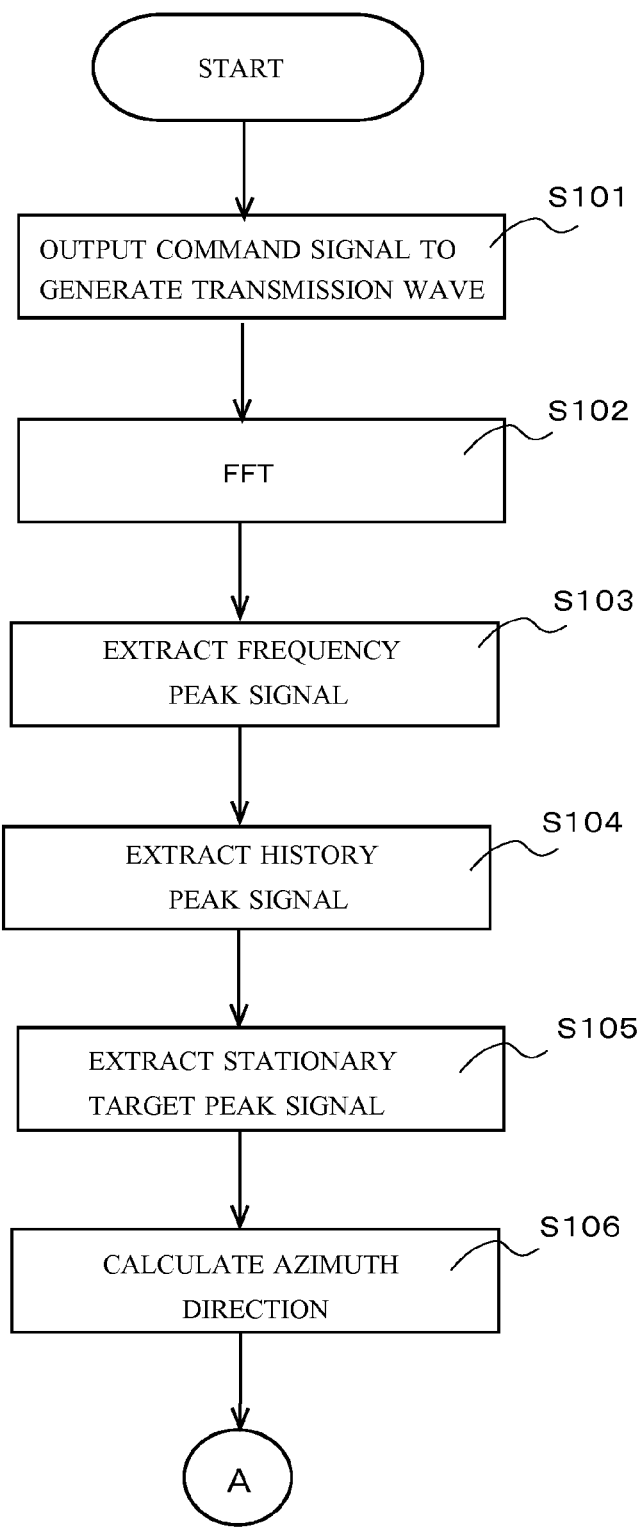
FIG. 4 illustrates a flowchart of a process of deriving target information performed by a signal processor.
Figure 5:
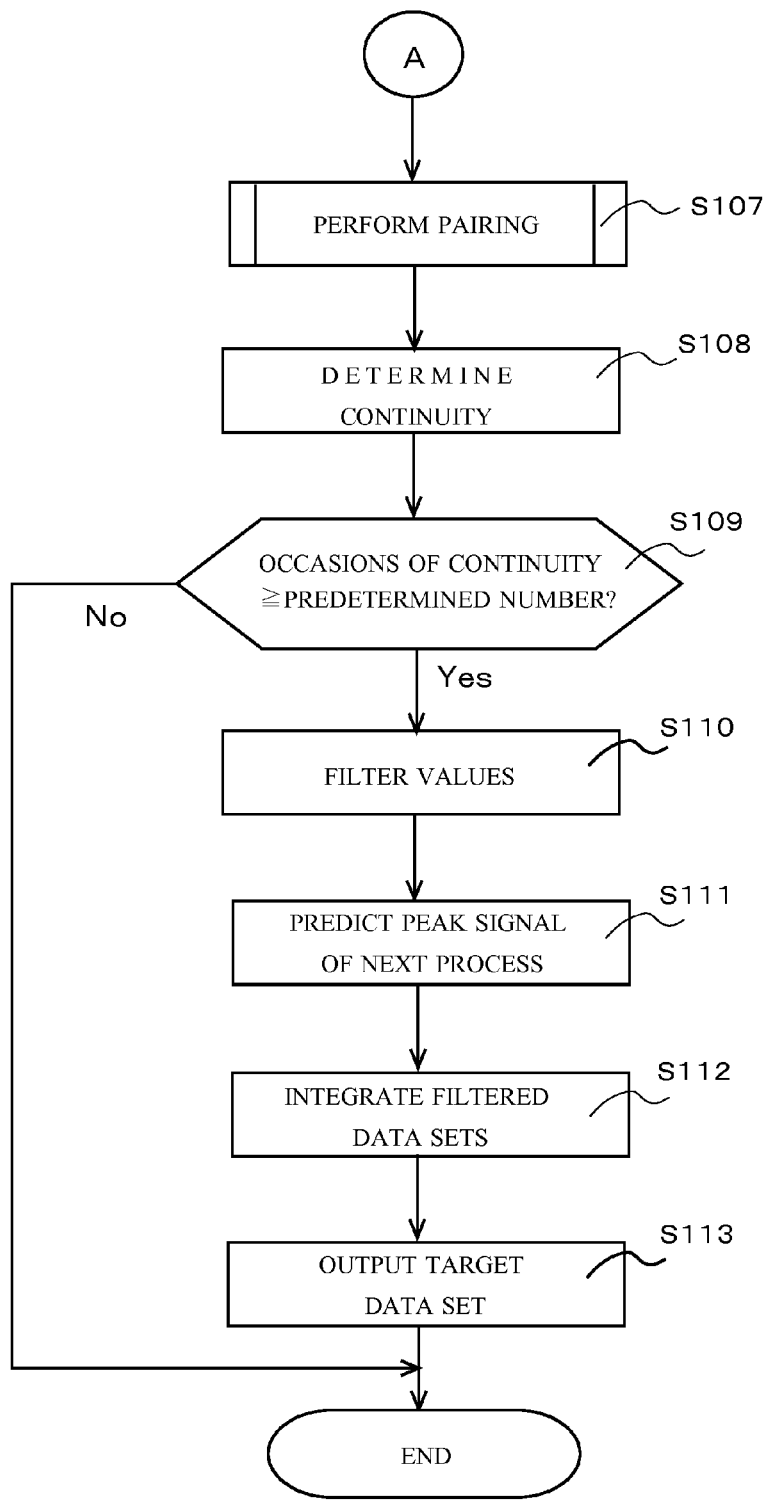
FIG. 5 illustrates a flowchart of a process of deriving target information performed by a signal processor.

FIG. 4 and FIG. 5 illustrate the flowcharts of a process of deriving the target information performed by the signal processor 18. The signal processor 18 outputs a command signal to the signal generator 15 to generate the transmission wave (a step S101). The signal generator 15 generates the transmission wave corresponding to the transmission signal TS based on the command signal from the signal processor 18. The generated transmission wave is output to an outside of the vehicle CA.

The receiving antenna 12 receives the reflection wave that is the transmission wave reflected by the target and outputs the reception signal RS to the mixer 13. The reception signal RS is mixed with the transmission signal TS by the mixer 13 and the beat signal that is the signal of the difference between the transmission signal TS and the reception signal RS is generated. The analogue beat signal BS is converted to the digital beat signal BS by the AD converter 14 and is output to the signal processor 18.

The signal processor 18 processes the digital beat signal BS in each of the up period and the down period, by using FFT (a step S102). As a result, the signal processor 18 obtains a frequency spectrum including a signal level value and phase information for each frequency relating to the beat signal BS in each of the up period and the down period. Moreover, the frequency spectrum of each of the receiving antennas 12a to 12d is obtained.

The signal processor 18 performs a "peak signal extraction" process of extracting a signal of which the signal level exceeds a predetermined threshold in the frequency spectrum, as a frequency peak signal (a step S103). Moreover, in the peak signal extraction process, the frequency peak signal is extracted in each of the up period and the down period and number of the frequency peak signals is determined.

The signal processor 18 performs a "history peak extraction" process of extracting the frequency peak signal of the target in the current process that is associated with the reflection point with which a target data set derived in the previous process is also associated and that has time continuity with the target data set, among the frequency peak signals extracted in the peak extraction process (a step S104). The history peak extraction process is described later in detail.

Next, the signal processor 18 extracts a frequency peak signal corresponding to a stationary target (hereinafter referred to as "stationary target peak signal") (a step S105). In a case where a frequency peak signal in the up period and a frequency peak signal in the down period are selected as a candidate for a combination, the stationary target peak signal is a peak signal that has a substantially same relative speed as the speed of the vehicle CA. Moreover, the stationary target is a target that has a substantially same relative speed as the speed of the vehicle CA. Moreover, a moving target moves at a particular speed and has a relative speed different from the speed of the vehicle CA.

The signal processor 18 performs arithmetic processing in each of the up period and the down period, by using a predetermined algorithm for the azimuth direction calculation, based on the frequency peak signal (a step S106). An example of the algorithm for the azimuth direction calculation is the estimation of signal parameters via rotational invariance techniques (ESPRIT). The signal processor 18 derives an angle $\theta_{up}$ of an angle peak signal in the up period and an angle $\theta_{dn}$ of an angle peak signal in the down period, using ESPRIT. The signal processor 18 derives an angle $\theta_m$ of the target based on a formula (1) below by pairing the angle peak signal in the up period and the angle peak signal in the down period.

Formula 1

$$\theta m = \frac{\theta up + \theta dn}{2} \quad (1)$$

The angle peak signal is derived based on the frequency peak signal and exceeds a predetermined threshold in an angle spectrum. The angle spectrum is derived by a process of calculating the azimuth direction of the frequency peak signal. Three or less angle peak signals can be derived from one frequency peak signal.

<2-2. Azimuth Direction Calculation by ESPRIT>

Figure 6:
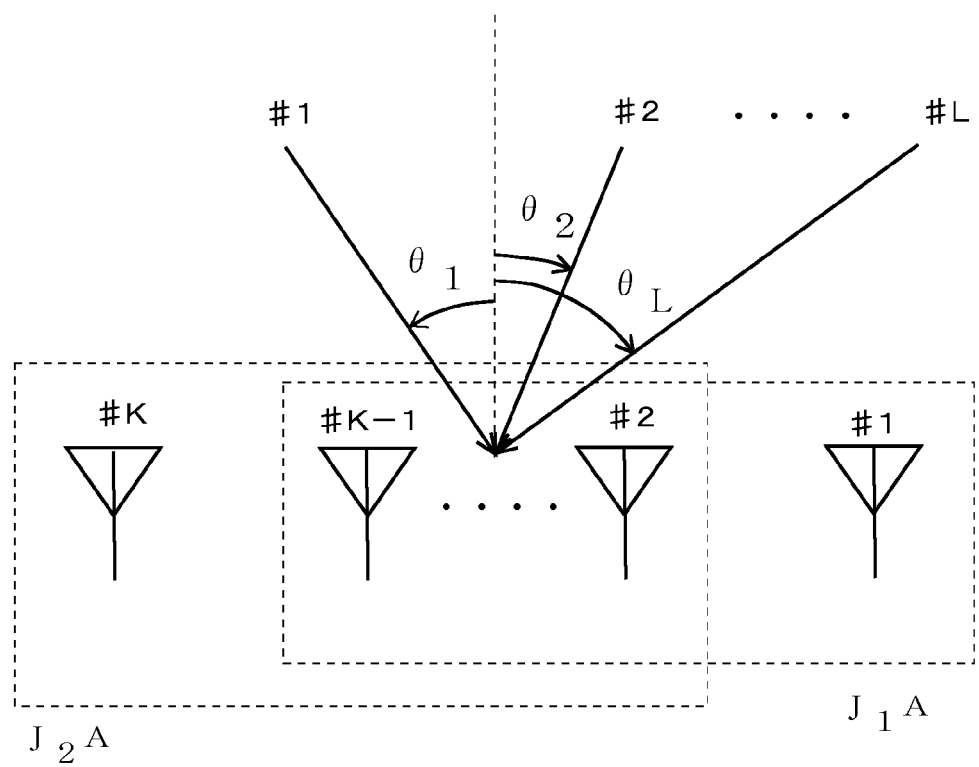
FIG. 6 illustrates details of ESPRIT process.

A process using ESPRIT (hereinafter referred to as "ESPRIT process") is explained. FIG. 6 illustrates details of the ESPRIT process. The ESPRIT is a method of predicting an arrival direction of an arrival wave (reflection wave) based on a phase difference between two sub-arrays, disposed at positions slightly different from each other, of the receiving antennas 12a to 12d.

FIG. 6 illustrates a K element linear array of antennas. Number of arrival wave is referred to as L and an orientation of an i-th arrival wave is referred to as $\theta_i$ (i=1, 2, ..., L). The ESPRIT is a technique for estimating phase rotation of each arrival wave, based on the rotational invariance "$J_1 A\Phi = J_2 A$," and the phase rotation is caused by a parallel move of the entire array. A matrix $J_1$ and a matrix $J_2$ are transformation matrices (K−1)×K. K refers to the number of the antennas of the receiving antenna 12. A is a direction matrix constituted by array response vectors using $\theta_1$ to $\theta_L$ as variables, and $\Phi$ is an L-th order diagonal matrix.

As illustrated in FIG. 6, in the K element linear array, when a first element to a (K−1)-th element are set as a sub-array #1 and a second element to a K-th element is set as a sub-array #2, $J_1 A$ and $J_2 A$ of the rotational invariance mean operations of extracting first to (K−1)-th rows and second to K-th rows of the matrix A, respectively. In other words, as illustrated in FIG. 6, $J_1 A$ and $J_2 A$ represent the direction matrices of the sub-array #1 and the sub-array #2, respectively.

Herein, when A has been already know, an arrival angle of a path may be estimated by acquiring $\Phi$, but since A needs to be estimated, $\Phi$ may not be directly obtained. Therefore, after a K×K covariance matrix $R_{xx}$ of a K-dimension reception signal vector is acquired, a signal subspace matrix $E_s$ is generated by using an eigenvector corresponding to an eigenvalue which is larger than thermal noise power $\sigma^2$, from an eigenvalue obtained by eigenvalue-expanding the $R_{xx}$.

The generated signal subspace matrix $E_s$ and the matrix A may be expressed as $A = E_s T^{-1}$ by using an L-th order regular matrix T, which uniquely exists between both sides. Herein, $E_s$ represents a K×L matrix and T represents the regular matrix of L×L. Accordingly, when $E_s$ and T are substituted into the rotational invariance, $(J_1 E_s)(T\Phi T^{-1}) = J_2 E_s$ is acquired. In the above equation, when $T\Phi T^{-1}$ is acquired and eigenvalue-expanded, an eigenvalue thereof becomes a diagonal component of Φ. Accordingly, an orientation of an arrival wave may be estimated from the eigenvalue. Thus, the signal processor 18 derives angles of targets of which number is one less than the number of the antennas of the receiving antenna 12, among a plurality of targets existing in different angles in a frequency. In other words, the signal processor 18 derives up to three angles of targets existing in a same frequency in each of the up period and the down period, by using the four antennas of the receiving antenna 12.

Next, with reference back to the explanation of the flowcharts, the process in FIG. 5 is explained. The signal processor 18 performs a process of pairing the angle peak signal in the up period with the angle peak signal in the down period (hereinafter referred to as "pairing process) (a step S107). In the pairing process, different pairing methods are used, depending on a type of the frequency peak signal from which the angle peak signal is extracted.

Concretely, the signal processor 18 performs a process of pairing history peak signals (hereinafter referred to as "history pairing process") that are the frequency peak signals. Moreover, the signal processor 18 performs a process of pairing the stationary target peak signals (hereinafter referred to as "stationary target pairing process"). Moreover, the signal processor 18 performs a process of pairing peak signals remaining after excluding the history peak signals and the stationary target peak signals from all peak signals (hereinafter referred to as "additional pairing process".

Figure 7:
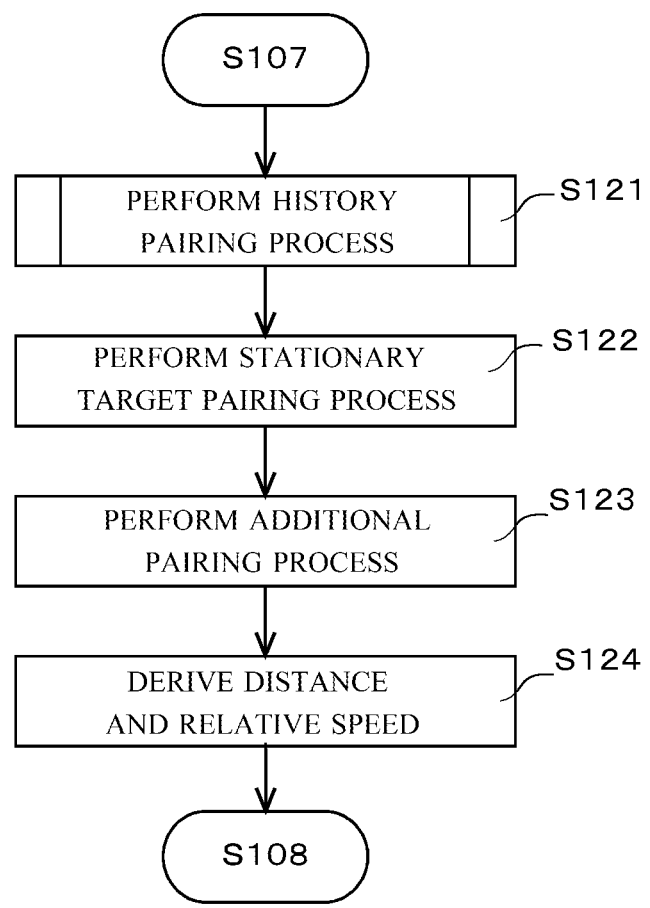
FIG. 7 illustrates a flowchart explaining a history pairing process, a stationary target pairing process and an additional pairing process.

FIG. 7 illustrates a flowchart explaining the history pairing process, the stationary target pairing process and the additional pairing process. The history pairing part 18d of the signal processor 18 performs the history pairing process, using the history peak signals extracted in the history peak extraction (a step S121). For example, Mahalanobis distance is used for the history pairing process. Concretely, the signal processor 18 derives an index, based on a formula (2), for determining whether or not the angle peak signals in a combination are associated with a same reflection point, by using two parameter values of an "angle difference" and an "angle signal level difference" between the angle peak signals derived based on the history peak signals in the up period and in the down period. In the formula (2), the Mahalanobis distance is referred to as RD. The angle difference is referred to as θdg. The angle signal level difference is referred to as θpg.

[Formula 2]

$$RD=(\theta dg)^2 \times 4.3+(\theta pg)^2 \times 1.09 \quad (2)$$

In a case of where the Mahalanobis distance is equal to or less than a predetermined value (e.g. 60), the history pairing part 18d determines that there is a high possibility that the angle peak signals in the up period and the down period of the combination are associated with the same reflection point and finalizes the combination as a history pair data set. In a case where the Mahalanobis distance of the combination exceeds the predetermined value, in other words, in a case where there is a low possibility that the angle peak signals of the combination are associated with a same reflection point, the history pairing part 18d examines whether or not another combination of other angle peak signals can be finalized as the history pair data set. This process is described later.

Next, the signal processor 18 performs the stationary target pairing process, using the stationary target peak signals extracted in the extraction of the stationary target peak signal (a step S122). The signal processor 18 derives the angle peak signal in the down period that exists in an angle range of approx. ±6 degrees, i.e. approx. 12 degrees from the angle of the angle peak signal in the up period and that has the smallest angle difference from the angle of the angle peak signal in the up period. Moreover, the signal processor 18 derives the angle peak signal in the up period that exists in an angle range of approx. ±6 degrees, i.e. approx. 12 degrees from the angle of the angle peak signal in the down period and that has the smallest angle difference from the angle of the angle peak signal in the down period. Then, in a case where the combination that has the smallest angle difference derived based on the angle peak signal in the up period is equal to the combination that has the smallest angle difference derived based on the angle peak signal in the down period and also where a difference between the signal level values of the two angle peak signals is equal to or less than a predetermined value (e.g. 20 db), the signal processor 18 finalizes the combination as the history pair data set.

Next, the signal processor 18 performs the additional pairing process, using peak signals remaining after excluding the history peak signals and the stationary target peak signals from all the peak signals extracted in the peak signal extraction process (a step S123). The signal processor 18 performs the additional pairing process, for example, using the Mahalanobis distance shown in the formula (2) and finalizes a combination that has the smallest Mahalanobis distance as a correct pair data set.

Then, the signal processor 18 derives the longitudinal distance, the relative speed and the latitude distance of the pair data set finalized in the pairing process from the steps S121 to S123, based on the angle derived based on the formula (1), using a formula (3), a formula (4) and the parameter values of the finalized pair data set (a step S124). Frequencies of the frequency peak signals in the up period and in the down periods are referred to as fup and fdn, respectively, in the formulae (3) and (4).

[Formula 3]

$$R = \frac{(fup + fdn) \times c}{8 \times \Delta F \times fm} \quad (3)$$

[Formula 4]

$$V = \frac{(fup - fdn)}{4 \times f0} \quad (4)$$

With reference back to the step S108 of FIG. 5, the signal processor 18 performs a continuity determination for determining whether or not the current pair data set paired in the current process has a relationship of time continuity with the previous pair data set paired in the previous process (a step S108). Herein, a following case shows a case where the current pair data set has the relationship of the time continuity with the previous pair data set, in other words, where the two pair data sets are consecutive with each other. The signal processor 18 determines that in a case where differences in all of the longitudinal distance, the lateral distance and the relative speed between the current pair data set and a prediction data set that is a prediction of the current pair data set predicted based on the previous pair data set, are within predetermined ranges, the current pair data set has the continuity with the previous pair data set. Thus, that the current pair data set is determined to be associated with the same reflection point with which the previous pair data set is associated. In a case where there are plural current pair data sets of which all of the differences from the previous pair data set are within the predetermined ranges, the signal processor 18 determines, for example, one data set that has a smallest difference in the longitudinal distance from the prediction pair data set, as the current pair data set having the continuity with the previous pair data set.

Moreover, the signal processor 18 determines that in a case where at least one of differences in the longitudinal distance, the lateral distance and the relative speed between the current pair data set and the prediction pair data set exceeds the predetermined range, the current pair data set does not have the relationship of time continuity with the previous pair data set. In other words, the signal processor 18 determines that the current pair data set does not have the continuity with the previous pair data set. The pair data set determined as inconsecutive, as described above, is deemed as a pair data set that is first derived in the current process, i.e. as a new pair data set.

Next, the signal processor 18 determines whether or not occasions when the current pair data set is determined as consecutive is equal to or more than a predetermined number (e.g. twice) (a step S109). A case below explains a case where the continuity of the current pair data set is determined twice. A pair data set (A) is derived as a new pair data set in a process two processes before the current process, and a pair data set (B) derived in the previous process is determined as consecutive with the pair data set (A) derived in the process two processes before the current process (first continuity) and then the pair data set (C) derived in the current process is determined as consecutive with the pair data set (B) derived in the previous process (second continuity). In a case where the signal processor 18 determines that the pair data sets which are associated with a same reflection point have been derived in at least three consecutive processes, such as two consecutive processes immediately before the current process and the current process (Yes in the step S109), the signal processor 18 performs a filtering process of the current pair data set (a step S110). In a case where the occasions when the current pair data set is determined as consecutive is less than twice (No in the step S109), the signal processor 18 ends the process.

In the step S110, the signal processor 18 filters the values of the longitudinal distance, the relative speed, the lateral direction and the signal level value, using the current pair data set and the prediction pair data set (the step S110).

In the filtering process, the signal processor 18 defines, for example, the lateral distance of a filtered data set in the current process as a sum of 75% of the lateral distance of the prediction pair data set and 25% of the lateral distance of the current pair data set. In other words, the signal processor 18 derives a value obtained by adding 75% of the lateral distance of the prediction pair data set to 25% of the lateral distance of the current pair data set as the lateral distance of the filtered data set in the current process. The signal processor 18 also performs the filtering process to obtain the longitudinal distance, the relative speed and the signal level value, as described above.

Next, the deriving part 18a of the signal processor 18 performs a next process prediction that is a process of deriving a prediction peak signal (a step S111). The prediction peak signal includes parameters, such as a prediction frequency and prediction angle, and is used in the history peak extraction process and/or another process in the step S104 in a next process performed next after the current process. Concretely, the deriving part 18a derives the prediction peak signal of a high-priority filtered data set, in each of the up period and the down period, for the vehicle control, among the filtered data sets derived in the current process.

The history pairing part 18d performs the history pairing based on the prediction frequency and the prediction angle of the prediction peak signal, as described later. The prediction frequency in the up period may be different from the prediction frequency in the down period, depending on the relative speed of the target. The prediction angle in the up period is the same as the prediction angle in the down period because of one target.

An example of the high-priority filtered data set for the vehicle control is a filtered data set of the moving target, such as the front vehicle traveling in the current traffic lane. An example of a low-priority filtered data set is a filtered data set of the stationary target, such as a guard rail provided on a side of the current traffic lane.

As for the high-priority filtered data set for the vehicle control, the target information needs to be derived in every process and the target information needs to be output to the vehicle controller 20 as soon as possible. Therefore, the radar apparatus 10 defines the high-priority filtered data set as a data set for which the history peak extraction and the history pairing processes are performed, and derives the target information of the filtered data set more preferentially than the low priority filtered data set.

Next, the signal processor 18 performs a process of integrating a plurality of the filtered data sets into one data set corresponding to one target (hereinafter referred to as "data integration process) (a step S112). For example, in a case where the longitudinal distances and the lateral distances of the plurality of filtered data sets derived by the signal processor 18 are comparatively close to each other and the relative speeds of the filtered data sets are substantially the same, the plurality of filtered data sets are highly likely to be associated with a plurality of the reflection points on one object. Therefore, the signal processor 18 integrates the plurality of filtered data sets into one data set to deem the plurality of filtered data sets as being associated with the same one object.

Then, the signal processor 18 outputs the high-priority filtered data set for the vehicle control to the vehicle controller 20, among the filtered data sets integrated in the step S112 (a step S113).

<3. History Peak Extraction and History Pairing>

Next concretely explained are details of the history peak extraction (the step S104 in FIG. 4) and the history pairing (the step S121 in FIG. 7) with reference to FIG. 8 to FIG. 12.

Figure 8A:
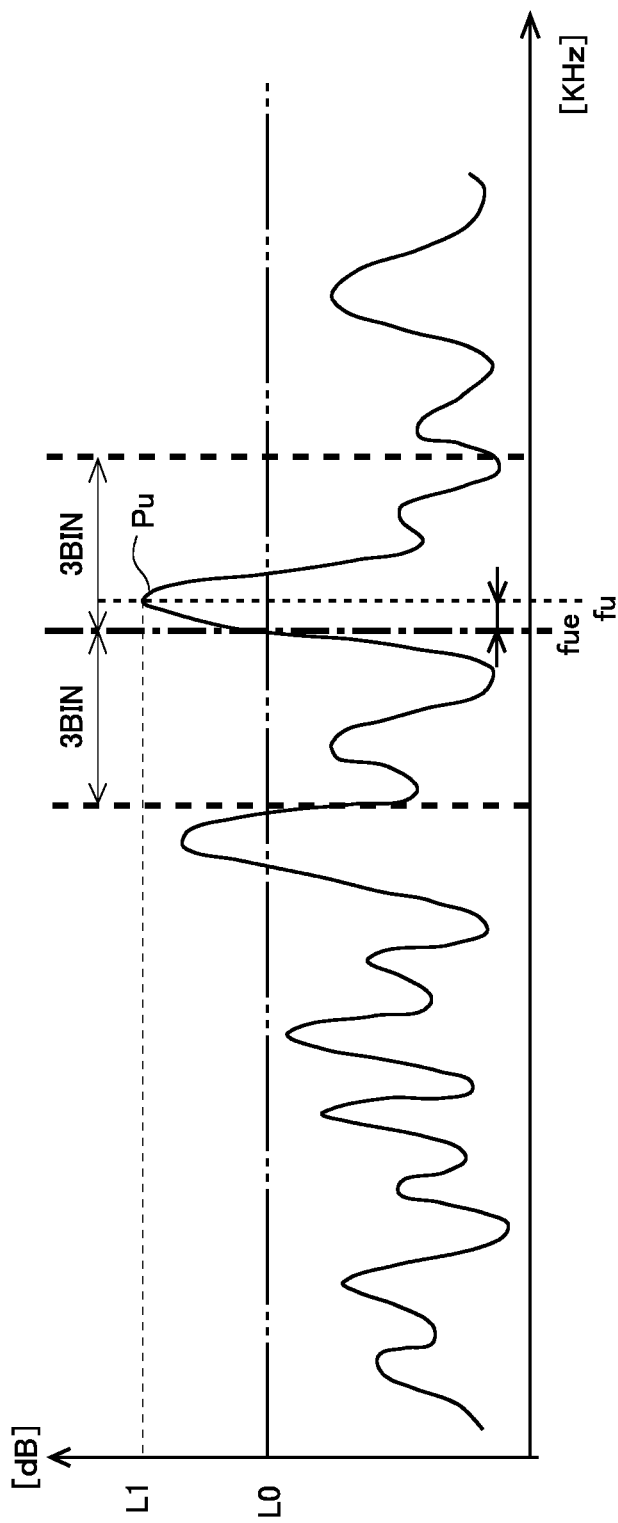
FIG. 8A illustrates a history peak extraction in an up period.
Figure 8B:
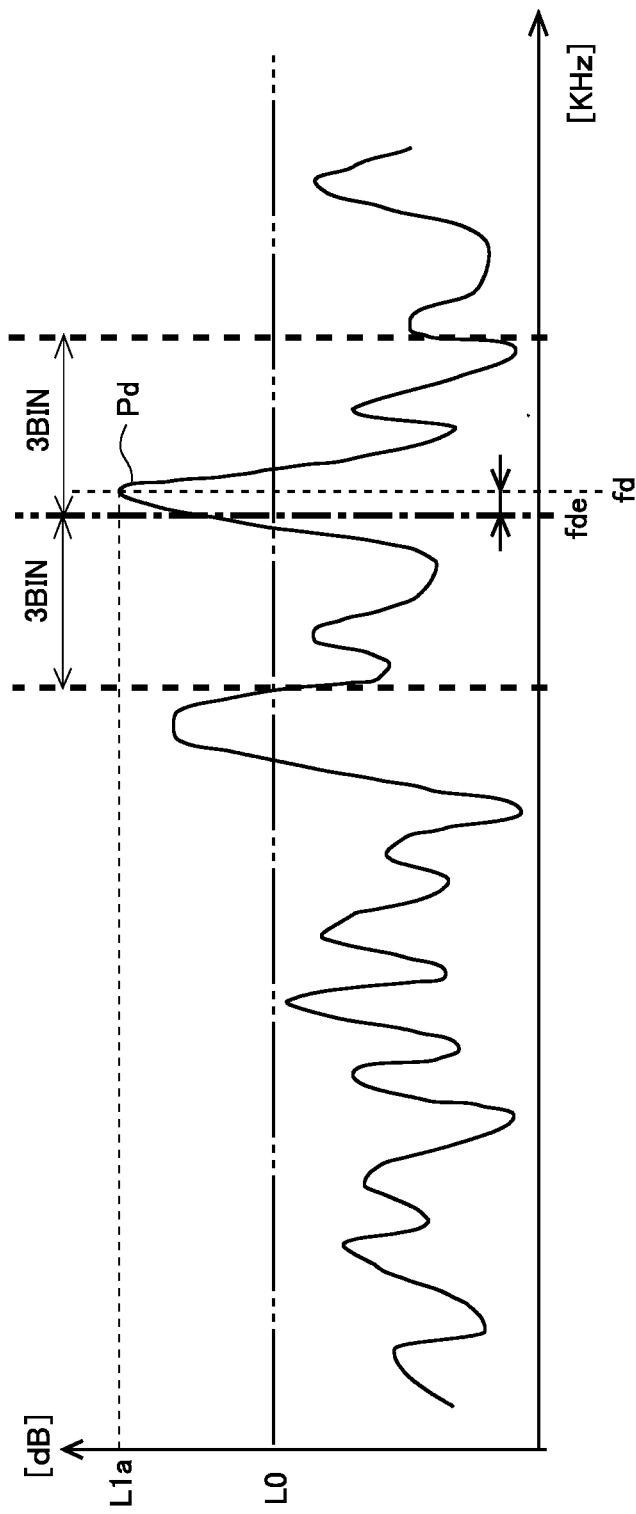
FIG. 8B illustrates a history peak extraction in a down period.

FIG. 8 illustrates the history peak extraction. A longitudinal axis and a horizontal axis of FIG. 8 represent signal level [dB] and frequency [kHz], respectively. FIG. 8A illustrates the history peak extraction in the up period and FIG. 8B illustrates the history peak extraction in the down period. The deriving part 18a derives the prediction peak signal in each of the up period and the down period. Then the setting part 18b sets a prediction region based on the prediction peak signals. The angle peak signal to be processed (hereinafter referred to as "object signal") for the history pairing is derived in the prediction region.

Concretely, the setting part 18b defines a prediction frequency range as a range of three bins higher to three bins lower than a reference frequency that is the prediction frequency of the prediction peak signal derived by the deriving part 18a in the next process prediction in the previous process (the step S111 in FIG. 5). Then, the frequency peak signal in the prediction frequency range is extracted as the history peak signal. One bin is approx. 468 Hz.

In FIG. 8A, a frequency peak signal Pu (a frequency fu and a signal level value L1) exists in an up-period prediction frequency range that has a prediction frequency fue as the reference frequency, and a frequency of the frequency peak signal Pu is the closest to the prediction frequency fue. The frequency peak signal Pu is one of the signals that exceed a threshold signal level L0 and that have been extracted in the peak extraction process in the step S103. Therefore, the frequency peak signal Pu is extracted as the history peak signal Pu in the up period.

In FIG. 8B, a frequency peak signal Pd (a frequency fdn and a signal level value L1a) exists in a down-period prediction frequency range that has a prediction frequency fde as the reference frequency, and a frequency of the frequency peak signal Pd is the closest to the prediction frequency fde. The frequency peak signal Pd is one of the signals that exceed the threshold signal level L0 and that have been extracted in the peak extraction process in the step S103. Therefore, the frequency peak signal Pd is extracted as the history peak signal Pd in the down period.

Next, the setting part 18b defines a prediction angle range of ±4 degrees from the prediction angle of the prediction peak signal serving as a reference angle. Then, the angle peak signal in the prediction angle range is deemed as the object signal for the history pairing.

Figure 9A:
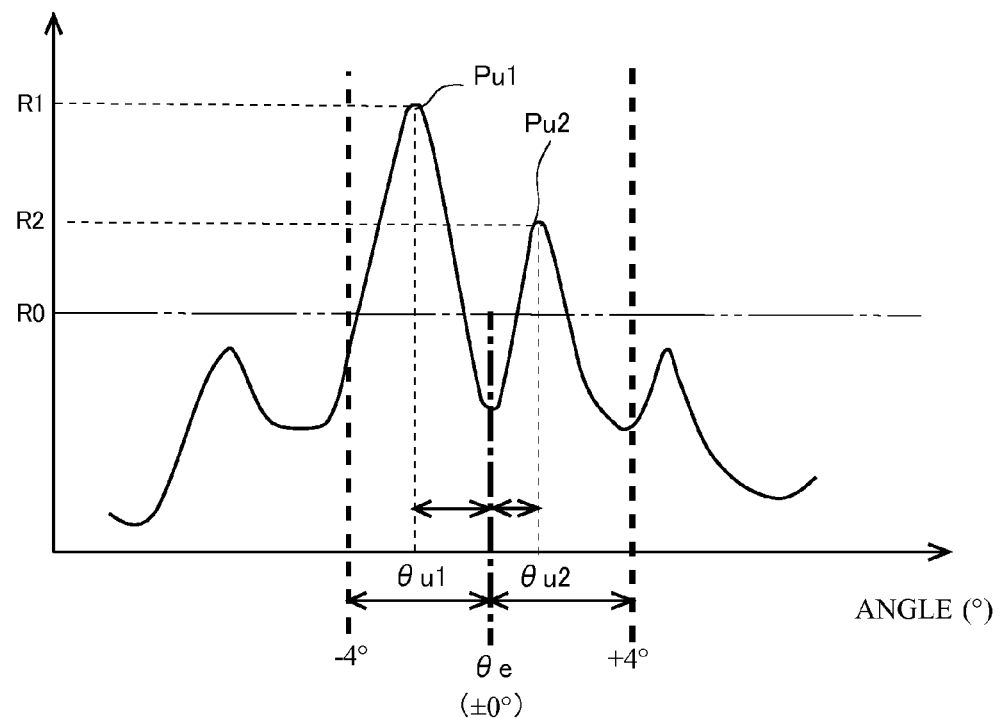
FIG. 9A illustrates derivation of an angle peak signal in a prediction angle range and a selection of an angle peak signal having an angle closest to a prediction angle in an up period.

FIG. 9A illustrates derivation of the angle peak signal in the prediction angle range and a selection of an angle peak signal having an angle closest to the prediction angle in the up period. In FIG. 9A, angle peak signals Pu1 and Pu2 exist in the prediction angle range in which a prediction angle θe (e.g. ±0 degree) is the reference angle and the angle peak signal Pu2 has an angle closest to the prediction angle θe. The angle peak signals Pu1 and Pu2 are among signals that exceed a signal level R0 serving as a threshold of the extraction of the angle peak signal from the angle spectrum. As described above, the angle peak signals Pu1 and Pu2 in the prediction angle range are derived and then the angle peak signal Pu2 having the angle closest to the prediction angle θe is selected as the object signal in the up period for the history pairing.

Figure 9B:
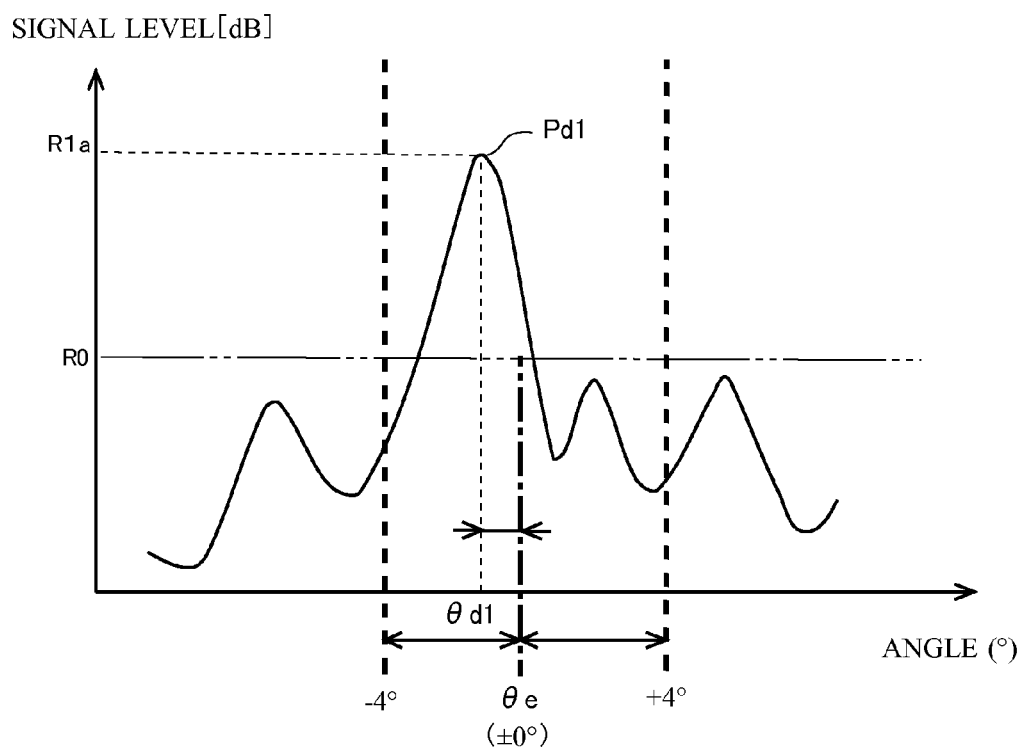
FIG. 9B illustrates derivation of an angle peak signal in a prediction angle range and a selection of an angle peak signal having an angle closest to a prediction angle in a down period.

FIG. 9B illustrates derivation of the angle peak signal in the prediction angle range and a selection of an angle peak signal having an angle closest to the prediction angle in the down period. In FIG. 9B, an angle peak signals Pd1 exists in the prediction angle range in which the prediction angle θe is the reference angle and the angle peak signal Pd1 has an angle closest to the prediction angle θe. The angle peak signal Pd1 is among the signals that exceed the signal level R0 serving as a threshold of the extraction of the angle peak signal from the angle spectrum. As described above, the angle peak signal Pd1 in the prediction angle range is derived and then the angle peak signal Pd1 having the angle closest to the prediction angle θe is selected as a signal of the down period for the history pairing.

As described above, the angle peak signals Pu1 and Pd1 which are the closest to the prediction angle are defined as data sets for the history pairing. In a case where a signal level difference between the two angle peak signals is equal to or less than a predetermined value, the signal processor 18 finalizes the two angle peak signals as the history pair data set. In a case where the signal level difference between the two angle peak signals exceeds the predetermined value, the signal processor 18 does not finalize the angle peak signals as the history pair data set and performs an extrapolation process.

In this embodiment of the invention, the history pairing part 18d deems the angle peak signal Pu2 in the up period and the angle peak signal Pd1 in the down period that have the angles closest to the prediction angle θe, as the signals for the history pairing. Then, in a case where the Mahalanobis distance based on a combination of the angle peak signal Pu2 and the angle peak signal Pd1 (hereinafter referred to as "first combination") is equal to or less than a predetermined value, the history pairing part 18d finalizes the first combination as a pair of the angle peak signals that have the highest possibility of being associated with a same reflection point.

However, in a case where the Mahalanobis distance based on the first combination exceeds the predetermined value, the determination part 18c of the signal processor 18 determines whether or not a plurality of the angle peak signals exist in at least one of the periods. In a case where the plurality of angle peak signals exist in at least one of the periods, the history pairing part 18d selects, as signals for the history pairing, a second combination of the angle peak signals that is different from the first combination of the angle peak signals that have the angles closest to the prediction angle θe.

When taking FIG. 9A as an example, the two different angle peak signals Pu1 and Pu2 exist in the up period. Therefore, the history pairing part 18d selects the angle peak signal Pu1 and the angle peak signal Pd1 in the down period as the second combination. Then, in a case where a signal level difference of the second combination is equal to or less than a predetermined value, the history pairing part 18d finalizes the second combination as the history pair data set.

As described above, in the case where the combination of the angle peak signals first selected as a first combination having the angles closest to the prediction angle θe does not satisfy a pairing approval condition based on the Mahalanobis distance, the determination part 18c determines whether or not a plurality of the angle peak signals exist in at least one of the up period and the down period. Then, in the case where the plurality of angle peak signals exist in at least one of the periods, the history pairing part 18d selects a second combination of different angle peak signals from the periods between which the angle peak difference is a smallest difference, except the first combination having the angles closest to the prediction angle θe. Then, the history pairing part 18d determines whether or not the signal level difference between the angle peak signals of the second combination is equal to or less than the predetermined value. In a case where the difference is equal to or less than the predetermined value, the history pairing part 18d finalizes the second combination as the history pair data set.

As described above, in a case where the first combination does not satisfy the pairing approval condition, the history pairing part 18d determines whether or not the second combination satisfies re-pairing approval conditions.

One of the re-pairing approval conditions is whether or not a plurality of the angle peak signals exist in at least one of the up period and the down period, and the other is whether or not the smallest angle difference between the angle peak signals in the up period and the down period in a combination is equal to or less than the predetermined value.

Figure 10:
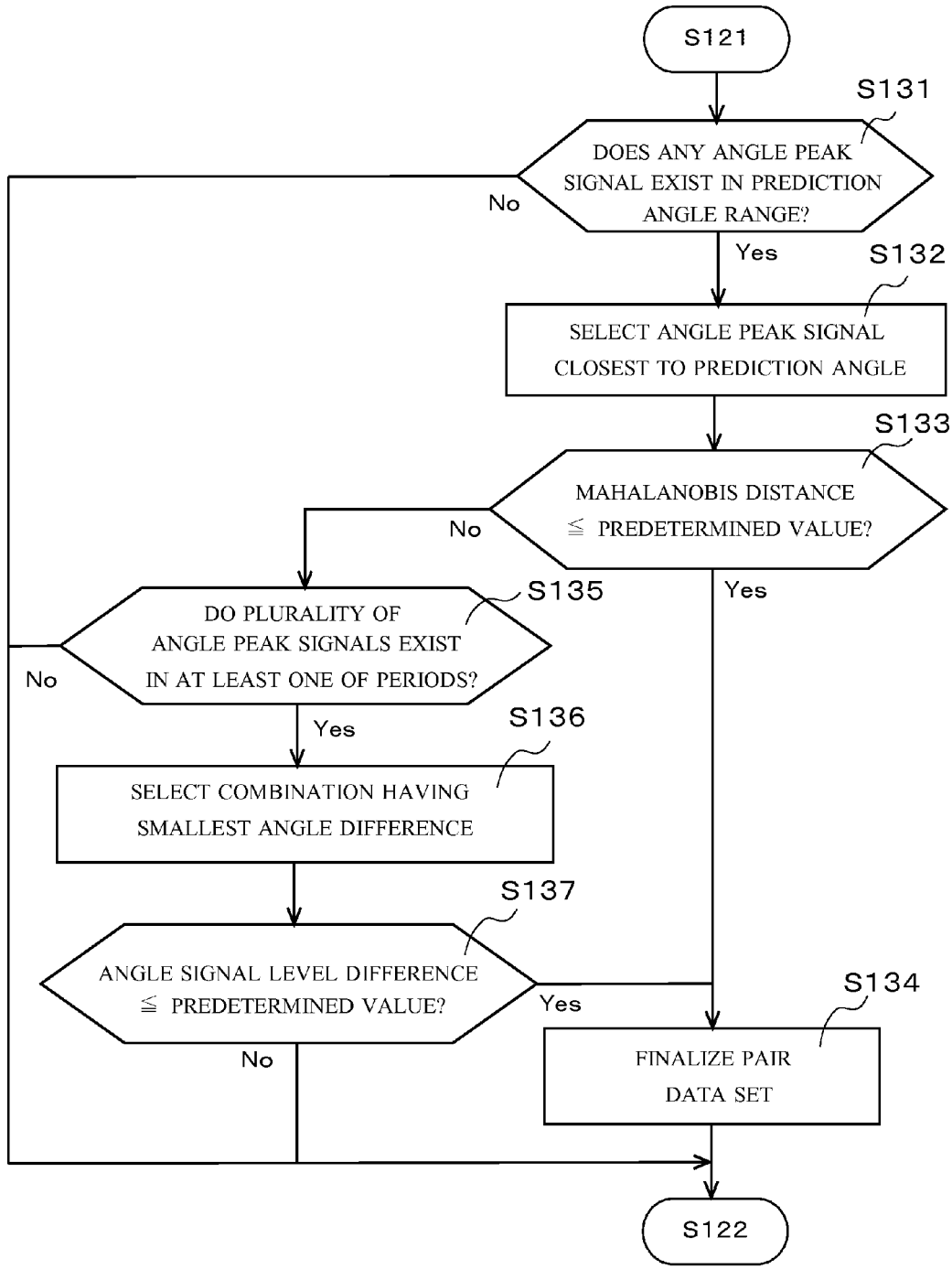
FIG. 10 is a flowchart that explains a history pairing process.

The history pairing process of the embodiment mentioned above is explained below with reference to FIG. 10. FIG. 10 illustrates a flowchart that explains the history pairing process. As shown in FIG. 10, the setting part 18b defines the prediction angle range based on the prediction angle θe in each of the up period and the down period. Then, the signal processor 18 determines whether or not one or more angle peak signals exist in the angle range (in approx. ±4 degrees)

(a step S131). In a case where no angle peak signal exists in the prediction angle range in one of the up period and the down period (No in the step S131), the history pairing part 18d ends the process without finalizing the history pair data set. In the case where the history pair data set is not finalized, the signal processor 18 performs the extrapolation process in the step S108 for determining the continuity. The extrapolation process is a process of temporarily securing the time continuity by replacing the history pair data set in the current process with the prediction data set obtained by predicting the history pair data set in the current process based on the filtered data set in the previous process.

In a case where one or more angle peak signals exist in the prediction angle range in each of the up period and the down period (Yes in the step S131), the signal processor 18 selects the angle peak signal that have the angle closest to the prediction angle θe in each of the periods (a step S132). Concretely, the signal processor 18 selects the angle peak signal Pu2 in the up period and the angle peak signal Pd1 in the down period shown in FIG. 9A and FIG. 9B.

Figure 11:
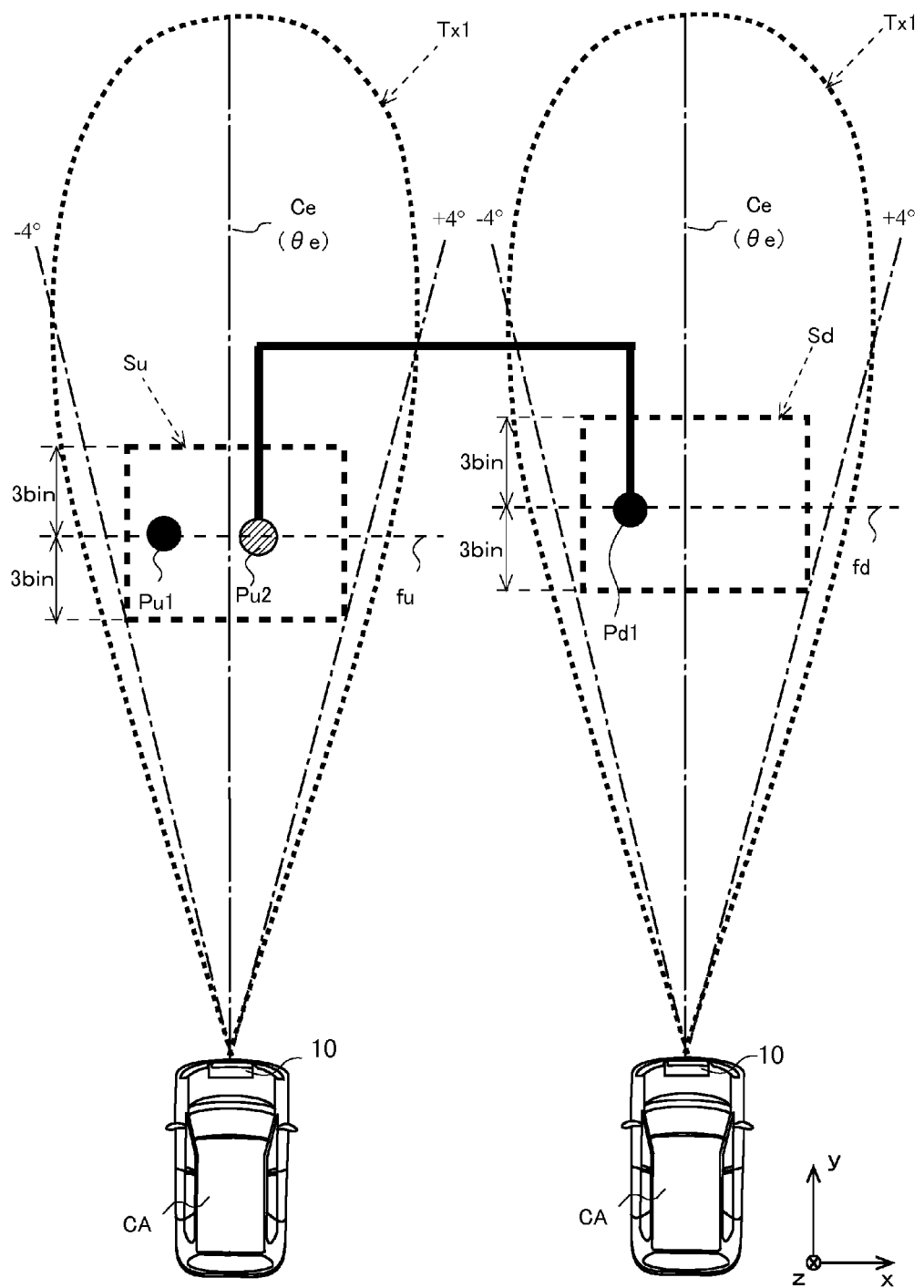
FIG. 11 illustrates a combination of angle peak signals having angles closest to a prediction angle.

Then, the history pairing part 18d determines whether or not the combination paired based on the Mahalanobis distance is finalized as the history pair data set, in other words, whether or not the pairing approval condition is satisfied (a step S133). For example, the history pairing part 18d determines whether or not a combination as shown in FIG. 11 is finalized as the pair data set. FIG. 11 illustrates a combination of the angle peak signals having the angles closest to the prediction angle θe. A prediction region Su in the up period is defined as a substantially rectangle range of approx. ±3 bins in a frequency direction (y-axis direction) and of approx. ±4 degrees in an angle direction (x-axis direction) from a prediction position that is an intersection of the frequency fu of the frequency peak signal Pu and the prediction angle θe.

As mentioned above, the prediction region is defined by the prediction frequency range and the prediction angle range. The angle peak signal in the prediction region Su is a candidate for a combination with the angle peak signal in the down period. The prediction region may be in a shape other than a rectangle (e.g. trapezoid and ellipse).

In an example shown in FIG. 11, the angle peak signals Pu1 and Pu2 exist in the prediction region Su. The signal processor 18 selects the angle peak signal Pu2 having an angle closest to the prediction angle θe as the candidate for the history pair data set.

A prediction region Sd in the down period is defined as a range of approx. ±3 bins in the frequency direction and of approx. ±4 degrees in the angle direction from a prediction position that is an intersection of the frequency fd of the frequency peak signal Pd and the prediction angle θe. The angle peak signal in the prediction region Sd is a candidate for a combination with the angle peak signal in the down period. In the example shown in FIG. 11, the angle peak signal Pd1 exists in the prediction region Sd. The signal processor 18 selects the angle peak signal Pd1 having an angle closest to the prediction angle θe as the candidate for the history pair data set.

With reference back to the step S133 in FIG. 10, the signal processor 18 determines, based on the Mahalanobis distance, whether or not there is a high possibility that the angle peak signals of the combination are associated with a same reflection point. Concretely, using the formula (2) mentioned above, the signal processor 18 derives the Mahalanobis distance based on the angle difference (θu2−θd1) and on the angle signal level difference (R2−R1a) between the angle peak signal Pu2 in the up period and the angle peak signal Pd1 in the down period. In a case where the Mahalanobis distance is equal to or less than the predetermined value (Yes in the step S133), the history pairing part 18d deems that the pairing approval condition is satisfied and finalizes the combination of the angle peak signals Pu2 and Pd1 as the history pair data set (a step S134).

In a case where the Mahalanobis distance exceeds the predetermined value in the step S133 (No in the step S133), the history pairing part 18d determined that the combination of the angle peak signals Pu2 and Pd1 is wrong, in other words, that there is a low possibility that the angle peak signals of the combination are not associated with the same reflection point. As a result, the history pairing part 18d does not finalize the combination of the angle peak signals as the history pair data set. Moreover, the history pairing part 18d determines whether or not another combination satisfies the pairing approval condition.

Concretely, the determination part 18c determines whether or not a plurality of angle peak signals exist in at least one of the up period and the down period (a step S135). In a case where the plurality of angle peak signals exist in at least one of the periods (Yes in the step S135), the signal processor 18 selects the combination of the angle peak signals between which the angle difference is a smallest difference, from the periods, except the combination of the angle peak signals having the angles closest to the prediction angle θe (a step S136).

Then, the history pairing part 18d determines whether or not the signal level difference of the combination of the angle peak signals between which the angle difference is the smallest difference is equal to or less than a predetermined value (e.g. 3.5 dB) (a step S137). In a case where the angle signal level difference is equal to or less than the predetermined value (Yes in the step S137), the history pairing part 18d finalizes the combination as the history pair data set (the step S134).

Figure 12:
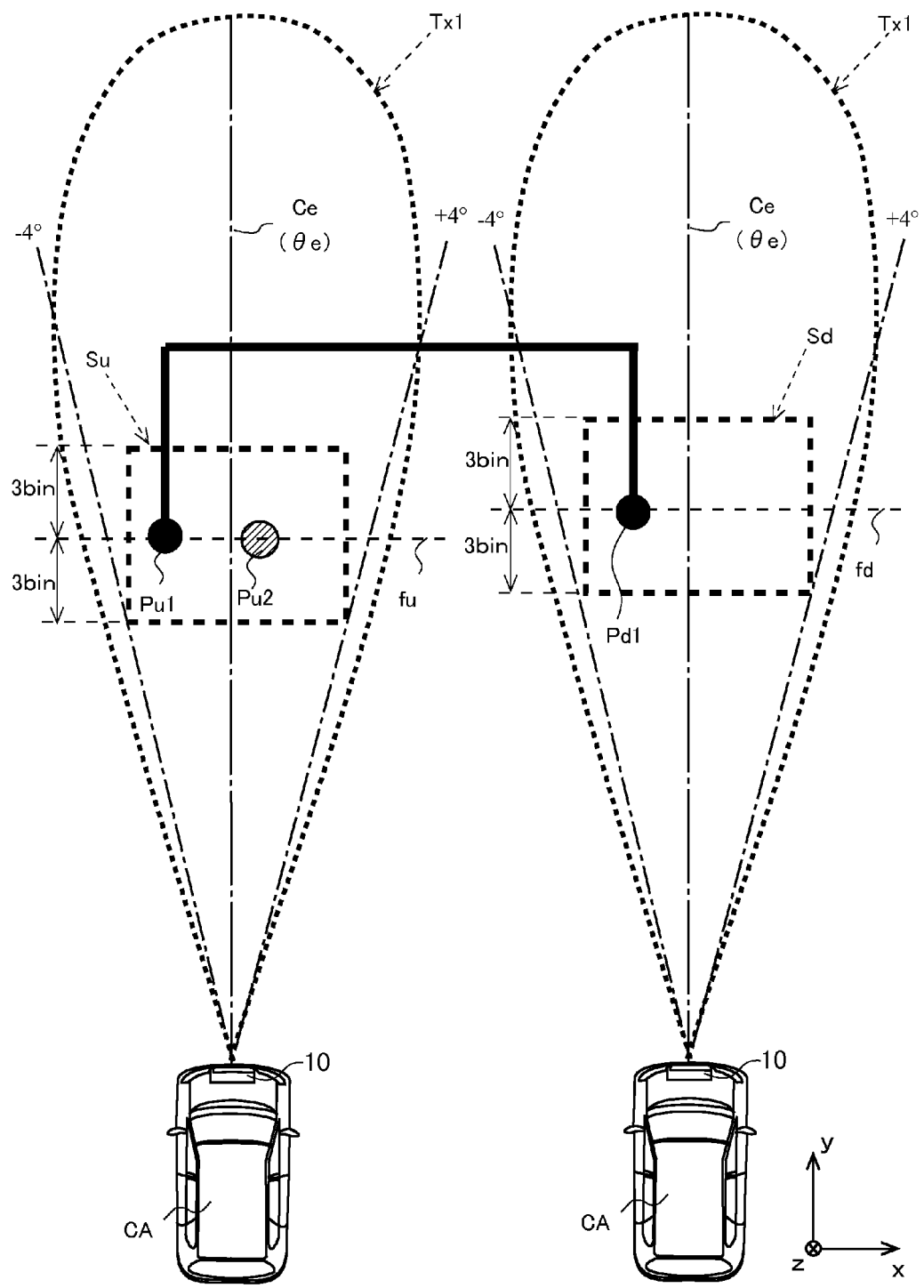
FIG. 12 shows illustrates a combination of which an angle difference is a smallest difference and of which an angle signal level difference is equal to or less than a predetermined value.

Concretely, the history pairing part 18d finalizes the combination as the history pair data set as shown in FIG. 12. FIG. 12 illustrates the combination of which the angle difference is a smallest difference and of which the angle signal level difference is equal to or less than the predetermined value. The two angle peak signals Pu1 and Pu2 exist in the prediction region Su of the up period, and the angle peak signal Pd1 exists in the prediction region Sd of the down period. In such a case, the condition of the plurality of angle peak signals in at least one of the periods, mentioned in the step S135 in FIG. 10, is satisfied. Then, the history pairing part 18d determines whether or not the angle peak signals Pu1 and Pd2, between which the angle difference is the smallest difference, satisfy the re-pairing approval condition, excluding the angle peak signal Pu2 that has been determined as the signal that does not satisfy the pairing approval condition, from the angle peak signals in the prediction region Su and the prediction region Sd.

In FIG. 12, since the angle peak signal Pd1 is only one signal in the prediction region Sd of the down period, the angle peak signal Pd1 is selected in the step S136 for selecting the combination of the angle peak signals between which the angle difference is a smallest difference. However, in a case where an angle peak signal different from the angle peak signal Pd1 exists in the prediction region Sd and where the angle difference between the different angle peak signal and the angle peak signal Pu1 is smaller than the angle difference between the angle peak signal Pd1 and the angle peak signal Pu1, the different angle peak signal is selected.

In a case where the angle signal level difference between the angle peak signals Pu1 and Pd1 is equal to or less than the predetermined value, the condition that the signal level difference between the angle peak signals is equal to or less than the predetermined value, mentioned in the step S137 in FIG. 10 is satisfied, and the history pairing part 18d finalizes the combination as the history pair data set. Thus, in the case where the plurality of angle peak signals exist in the prediction region, use of the extrapolation process is minimized and, at the same time, the combination of the angle peak signals having the highest possibility to be associated with a same reflection point is finalized as the history pair data set. Thus, an actual position of the target can be derived.

In a case where the plurality of angle peak signals do not exist in either of the up period and the down period in the step S135 (No in the step S135) or in a case where the angle signal level difference between the angle peak signals exceeds the predetermined value in the step S137 (No in the step S137), the history pairing part 18d ends the process without finalizing the history pair data set. As a result, the signal processor 18 performs the extrapolation process.

As described above, in this embodiment, the signal processor 18 derives the angle peak signal existing at a position closest to the prediction position obtained based on the prediction frequency and the prediction angle in each of the up period and the down period. The signal processor 18 deems the derived angle peak signals as candidates for a combination. In a case where the angle peak signals that are the candidates for the combination satisfy the pairing approval condition based on the Mahalanobis distance, the signal processor 18 finalizes the combination of the signals as the history pair data set.

However, in the case where the angle peak signals of the combination do not satisfy the pairing approval condition based on the Mahalanobis distance, the signal processor 18 selects a different combination and determines whether or not the different combination satisfies the re-pairing approval condition. In a case where the different combination satisfies the re-pairing approval condition, the signal processor 18 finalizes the different combination as the history pair data set. Accordingly, the radar apparatus 10 can finalize the history pair data set based on at least one of the pairing approval condition and the re-pairing approval condition used in the pairing process and can derive the actual position of the target while minimizing the use of the extrapolation process.

Second Embodiment

Next, a second embodiment is described. A signal processor 18 of a radar apparatus 10 in the second embodiment performs a process of finalizing a combination of angle peak signals as a history pair data set by reducing an angle range of a prediction region as a longitudinal distance of a target becomes greater, in the history pairing process explained in the first embodiment.

Generally, as the longitudinal distance becomes greater, a distance corresponding to a prediction angle range that is the angle range of the prediction region becomes greater. As the longitudinal distance becomes greater, even if the angle range is fixed (e.g. ±4 degrees), a lateral distance becomes greater. Thus, in a case where a target exists in a current traffic lane in a relatively long distance, a process of re-pairing of a different combination performed by a history pairing part 18d in the first embodiment may include an angle peak signal of a target existing outside a range of the current traffic lane, such as a next traffic lane of the current traffic lane, in the prediction region. Therefore, the angle peak signal outside the range of the current traffic lane may become a candidate for a combination with an angle peak signal in the current traffic lane and the combination of the angle peak signals may be finalized as the history pair data set. The process described in the second embodiment is a process of preventing from finalizing a wrong combination as the history pair data set.

The radar apparatus 10 in the second embodiment is almost the same as the radar apparatus 10 in the first embodiment. However, a history pairing process in the second embodiment is partially different. The differences are mainly hereinafter described with reference to FIG. 13 to FIG. 16. Herein, the angle peak signal is generated based on one frequency peak signal. Therefore, the angle peak signal has a parameter of the frequency.

Figure 13:
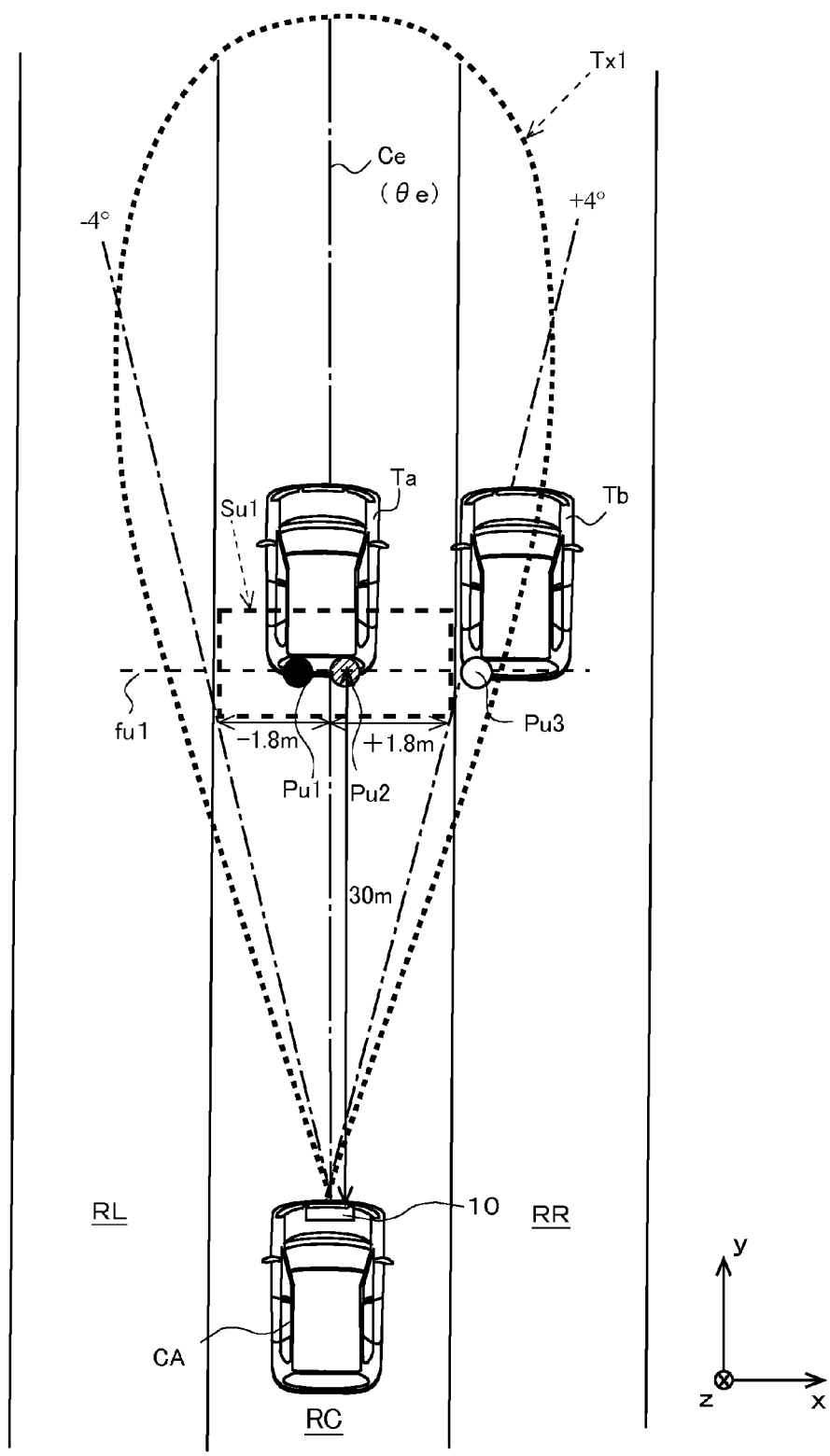
FIG. 13 illustrates a prediction region where an angle peak signal exists in a relatively short distance.

FIG. 13 illustrates a prediction region Su1 where the angle peak signal exists in a relatively short distance from a vehicle CA. In this embodiment, the process performed in an up period is described as an example. However, the process is also performed for a down period. Angle peak signals Pu1, Pu2 and Pu3 in the up period are signals generated based on a frequency peak signal of a frequency fu1. The frequency fu1 corresponds to, for example, a longitudinal distance of 30 m. The prediction region Su1 is defined as a range of approx. ±3 bins in a frequency direction (y-axis direction) and of approx. ±4 degrees in an angle direction (x-axis direction) from a prediction position of an intersection of the frequency fu1 and a prediction angle θe. Given that the prediction angle θe is the lateral distance of ±0 m, the lateral distance of the prediction region Su1 is approx. ±1.8 m, i.e. approx. 3.6 m, which includes a current traffic lane RC. Therefore, the prediction region Su1 includes only the angle peak signals Pu1 and Pu2 of a front vehicle Ta traveling in front of a host vehicle in the current traffic lane RC. In other words, the prediction region Su1 does not include the angle peak signal Pu3 of a near vehicle Tb traveling in a right traffic lane RR.

Figure 14:
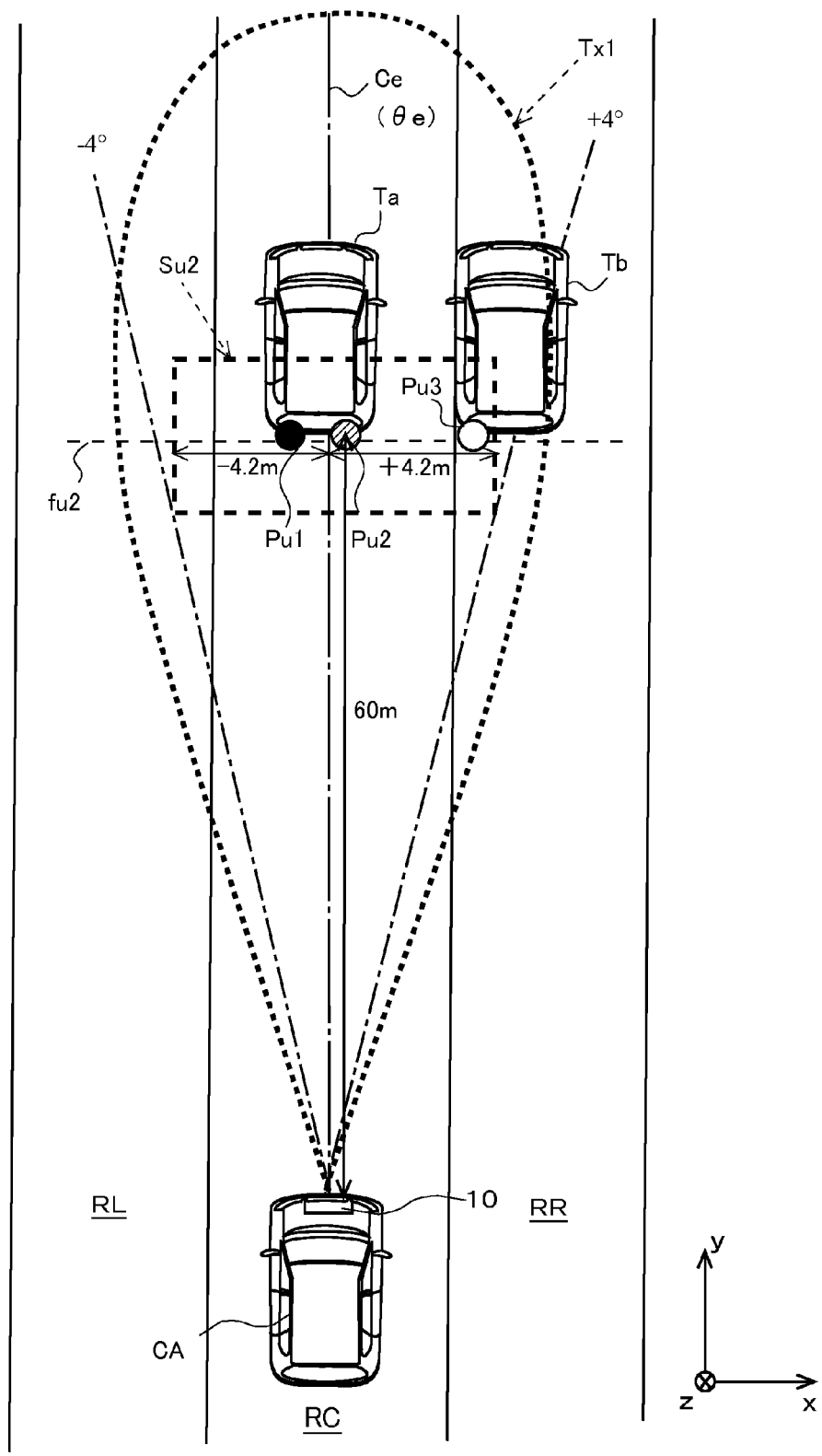
FIG. 14 illustrates a prediction region where an angle peak signal exists in a relatively long distance.

Next explained is a case where the angle peak signal exists in a relatively long distance from the vehicle CA. FIG. 14 illustrates a prediction region Su2 where the angle peak signal exists in the relatively long distance. The angle peak signals Pu1, Pu2 and Pu3 in the up period in FIG. 14 are signals generated based on a frequency peak signal of a frequency fu2 equivalent to the longitudinal distance of 60 m. The prediction region Su2 is defined as a range of approx. ±3 bins in the frequency direction (y-axis direction) and approx. ±4 degrees in the angle direction (x-axis direction) from a prediction position of an intersection of the frequency fu2 and the prediction angle θe. Given that the prediction angle θe is the lateral distance of ±0 m, the lateral distance of the prediction region Su2 is approx. ±4.2 m, i.e. approx. 8.4 m, which includes the current traffic lane RC and the next traffic lanes of the right traffic lane RR and a left traffic lane RL. Therefore, the prediction region Su2 includes the angle peak signals Pu1 and Pu2 of the front vehicle Ta in the current traffic lane RC and also the angle peak signal Pu3 of the near vehicle Tb traveling in the right traffic lane RR. Since the angle peak signals not only of the front vehicle Ta but also of the near vehicle Tb are included as the object signals for re-pairing, a wrongly-paired history pair data set may be finalized in the process of re-pairing performed by the history pairing part 18d.

Figure 15:
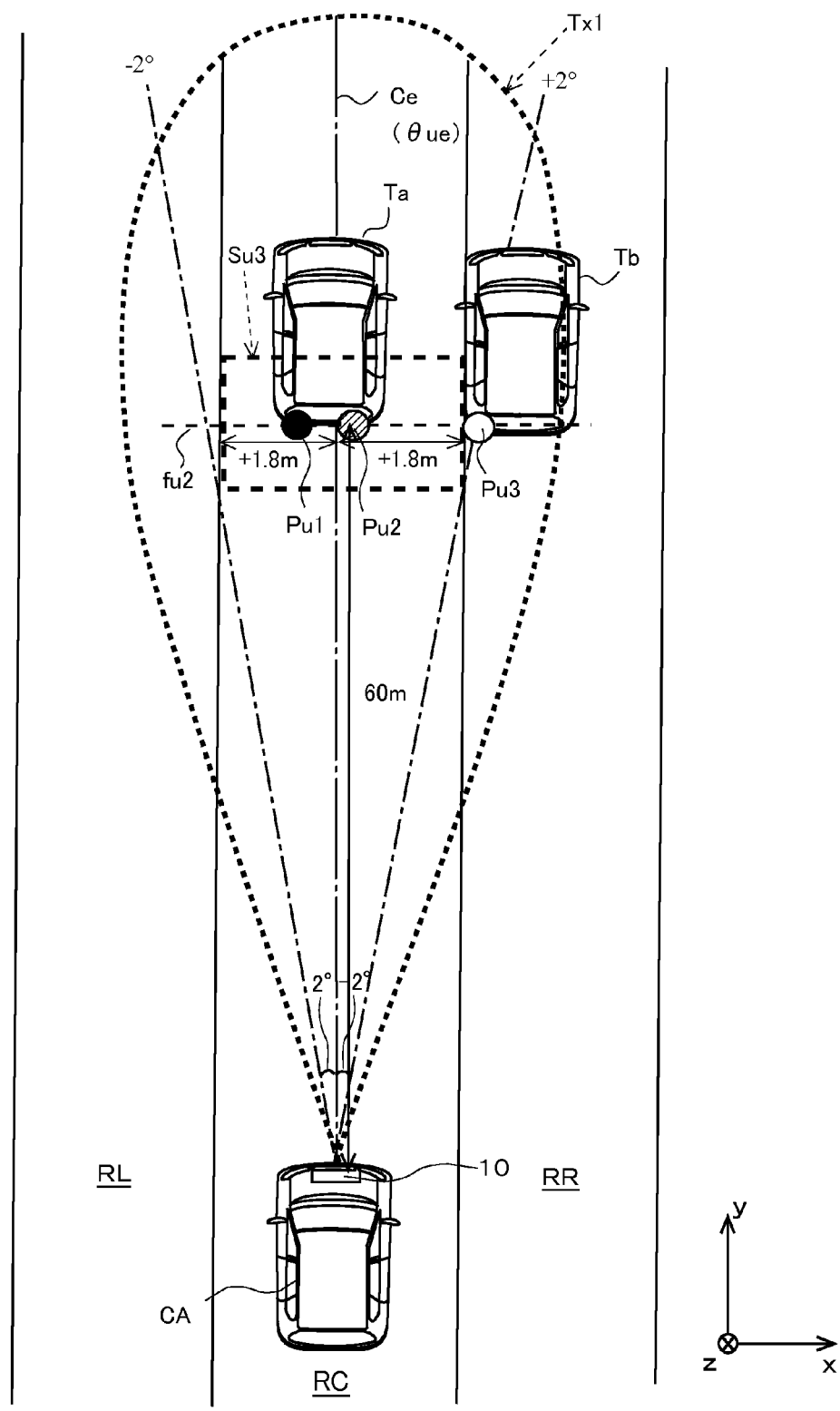
FIG. 15 illustrates a situation where as a longitudinal distance of an angle peak signal becomes greater, an angle range is narrowed.

Therefore, as the longitudinal distance of the angle peak signal becomes greater, the history pairing part 18d performs a process of narrowing the angle range in the prediction region. FIG. 15 illustrates a situation where as the longitudinal distance of the angle peak signal becomes greater, the angle range is narrowed. As shown in FIG. 15, the signal processor 18 selects the angle peak signal that is a candidate for the process of re-pairing, from a prediction region Su3 of which the angle range is approx. ±2 degrees narrower than the angle range of approx. ±4 degrees of the prediction region Su1. A setting part 18*b* adjusts the angle range of the prediction region.

The angle peak signals Pu1 and Pu2 of the front vehicle Ta traveling in the current traffic lane RC in the prediction region Su3 are selected as the candidates for re-pairing. In other words, the signal processor 18 does not select the angle peak signal Pu3 of the near vehicle Tb traveling in the right traffic lane RR outside the prediction region Su3. Thus, in the process of re-pairing, the radar apparatus 10 can excludes the angle peak signal existing outside a range of the current traffic lane RC in which the vehicle CA is traveling, from the candidates for re-pairing.

The foregoing values of the prediction angle range of the prediction region according to the longitudinal distance of the angle peak signal are shown as examples, and a different angle range that can exclude the angle peak signal existing outside the range of the current traffic lane RC may be used. For example, in a case of the longitudinal distance of the angle peak signal of approx. 50 m, the angle range of the prediction region may be approx. ±2 degrees and in a case of the longitudinal distance of the angle peak signal of 100 m, the angle range of the prediction region may be approx. ±1 degrees.

Figure 16:
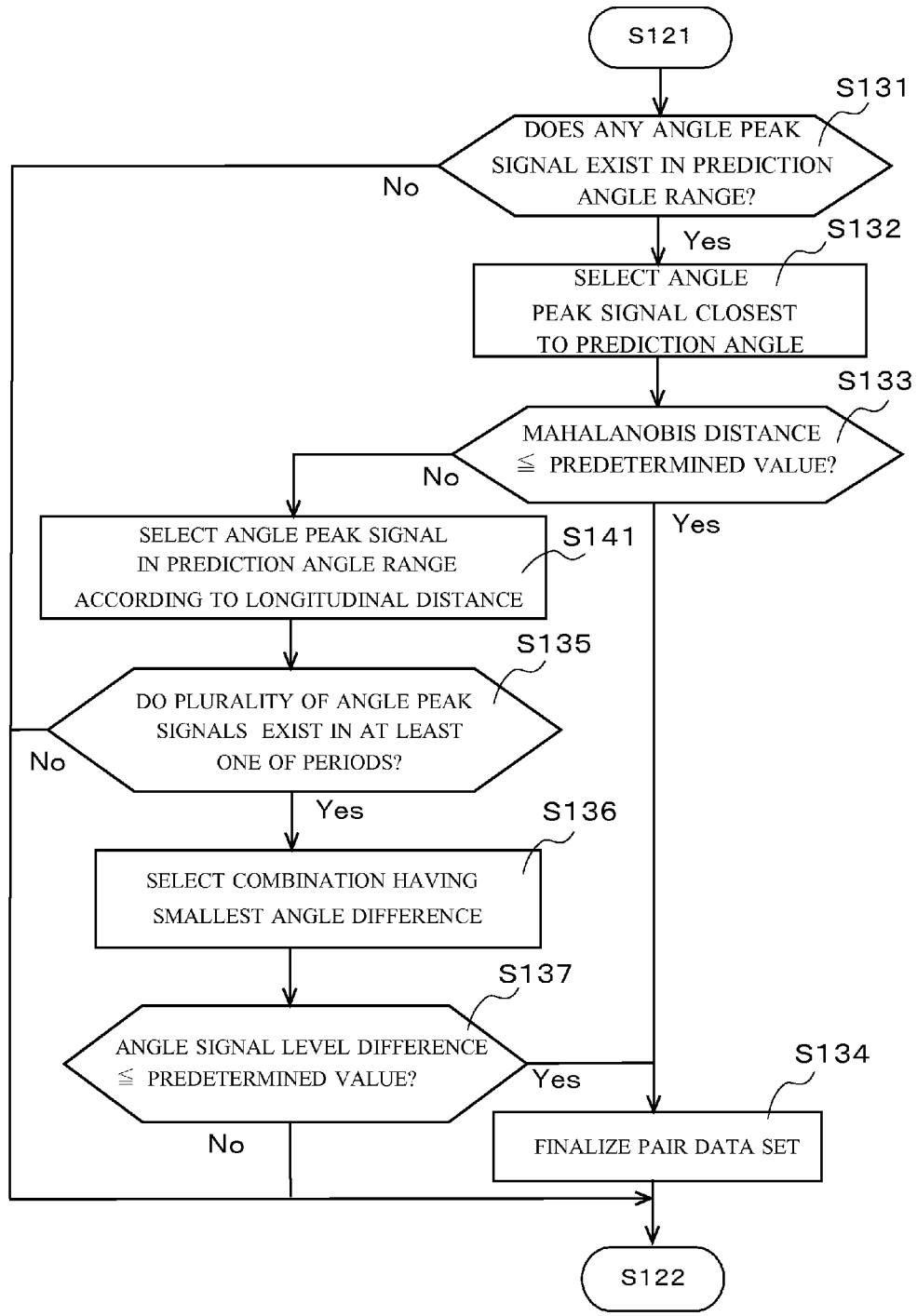
FIG. 16 illustrates a flowchart of a process performed in a second embodiment.

FIG. 16 illustrates a flowchart of the process performed in the second embodiment. In a case where a Mahalanobis distance exceeds a predetermined value (No in a step S133), the history pairing part 18*d* sets the prediction angle range according to the longitudinal distance of the angle peak signal. The signal processor 18 selects the angle peak signal in the set prediction angle range (a step S141). In other words, the signal processor 18 selects the angle peak signal in a predetermined angle range (e.g. in the angle of approx. ±4 degrees) in each of the up period and the down period, in the step S131. In the step S141, the signal processor 18 selects the angle peak signal in the prediction angle range according to the longitudinal distance of the angle peak signal. For example, in a case where the longitudinal distance of the angle peak signal is 30 m, the prediction angle range is approx. ±4 degrees. Therefore, an angle peak signal same as the angle peak signals selected in the step S131 is selected. Moreover, in a case where the longitudinal distance of the angle peak signal is 60 m, the prediction angle range is approx. ±2 degrees. Therefore, the angle peak signal existing in a range narrower than the angle range for the longitudinal distance of 30 m is selected.

After selecting the angle peak signal existing (step S141) in the angle range according to the longitudinal distance of the angle peak signal, the signal processor 18 performs the process of re-pairing (steps S135 to S137). As described above, as the longitudinal distance of the angle peak signal becomes greater, the radar apparatus 10 narrows the angle range of the prediction region. Thus, the radar apparatus 10 can exclude the angle peak signal outside the range of the current traffic lane RC in which the vehicle CA is traveling, from the candidates for re-pairing and can select only the angle peak signal in the range of the current traffic lane RC as the candidate for re-pairing.

The foregoing explanation of the process performed in the second embodiment describes that the signal processor 18 selects the angle peak signal in the predetermined angle range in each of the up period and the down period in the step S131, and then the signal processor 18 selects the angle peak signal in the prediction angle range according to the longitudinal distance of the angle peak signal in the step S141. As another process, the signal processor 18 may first perform the process of selecting the angle peak signal in the prediction angle range according to the longitudinal distance of the angle peak signal. In other words, the signal processor 18 may perform the step S141 instead of the step S131.

Third Embodiment

Next, a third embodiment is explained. In a case where an angle peak signal exists in a relatively short distance from a vehicle CA in a current traffic lane RC in which the vehicle CA is traveling, a signal processor 18 of a radar apparatus 10 in the third embodiment performs a process of re-pairing (the steps S135 to S137 in FIG. 10). In other words, in a case where the angle peak signal exists in a relatively long distance from the vehicle CA or in a case where the angle peak signal exists in at least one of a left next traffic lane RL and a right next traffic lane RR but does not exist in the current traffic lane RC in which the vehicle CA is traveling, the signal processor 18 does not perform the process of re-pairing but performs only the process of history pairing based on the Mahalanobis distance. Due to those processes, the signal processor 18 can reduce processing load caused by derivation of target information and can prevent from finalizing a wrong combination of the angle peak signal in the current traffic lane and the angle peak signal in the next traffic lane, as the history pair data set.

A structure and a function of the radar apparatus 10 in the third embodiment is the same as the structure and the function of the radar apparatus 10 in the first embodiment, except that the signal processor 18 in the third embodiment includes a detector 18*e*. However, a history pairing process in the third embodiment is partially different. A difference is mainly hereinafter explained with reference to FIG. 17 to FIG. 18.

Figure 17A:
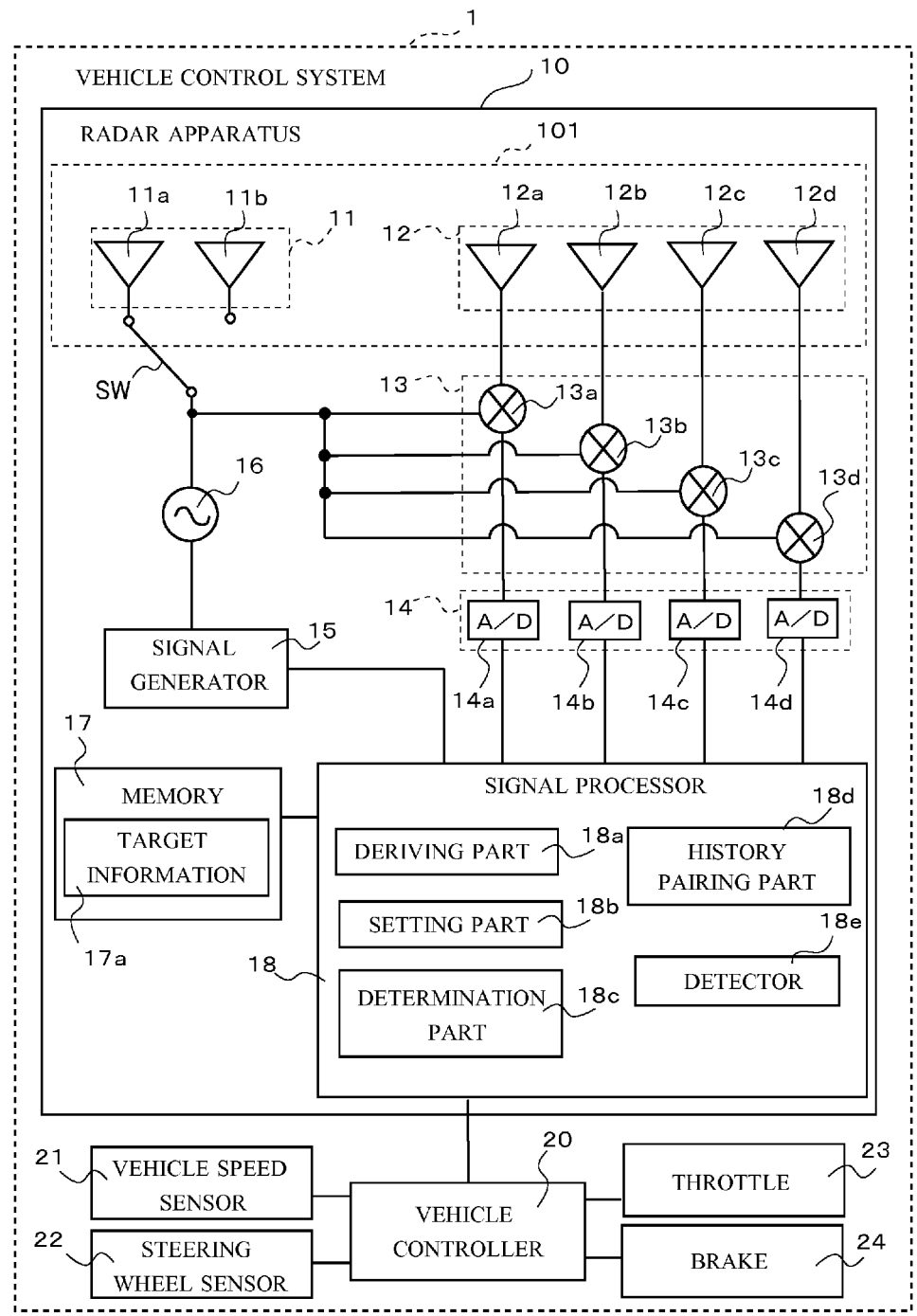
FIG. 17A illustrates a block diagram of a vehicle control system in a third embodiment.

FIG. 17A illustrates a block diagram of a vehicle control system 1 in the third embodiment. The signal processor 18 of the radar apparatus 10 includes the detector 18*e*. The detector 18*e* detects whether or not a combination of the angle peak signals in a previous process exists in a short distance range that is a range in a relatively short distance from the vehicle CA, in a current traffic lane region that is a range of the current traffic lane RC in which the vehicle CA is traveling.

Figure 17B:
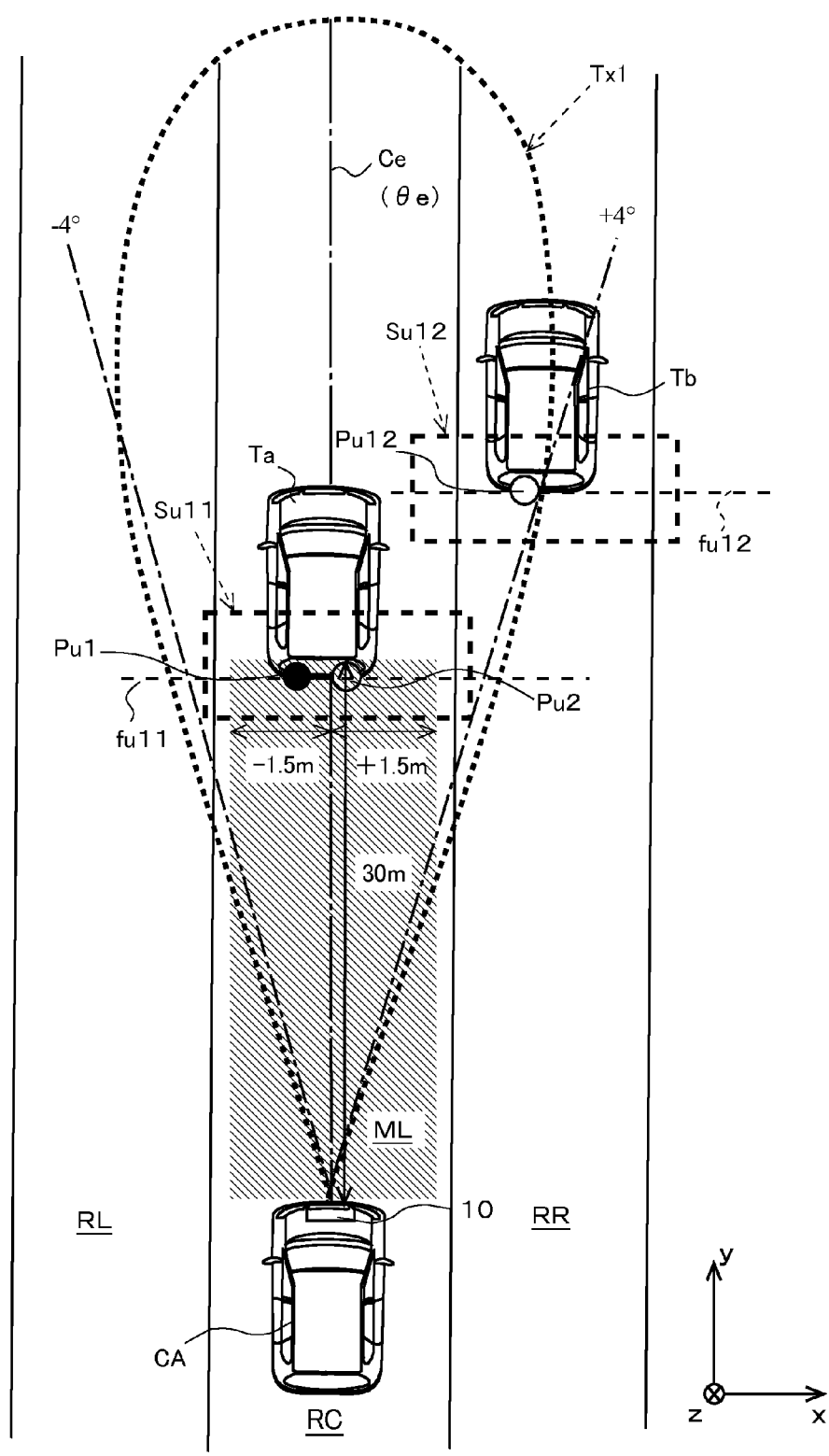
FIG. 17B illustrates a current traffic lane region including an object signal for re-pairing.

FIG. 17B illustrates a current traffic lane region ML including the object signal for re-pairing. Given that the vehicle CA is located at a longitudinal distance of 0 m and at a lateral distance of ±0 m, the current traffic lane region ML is a rectangular region having the longitudinal distance equivalent to 30 m and the lateral distance equivalent to approx. ±1.5 m, i.e., approx. 3.0 m. The current traffic lane region ML may be in a shape other than a rectangle (e.g. trapezoid and ellipse). In this embodiment, a process performed in an up period is described as an example. However, the process is also performed for a down period.

In a case where the angle peak signal is derived in the current process, the detector 18*e* determines whether or not a position represented by a filtered data set that has been derived in the previous process (hereinafter referred to as "previous filtered data set") and that has continuity with the angle peak signal, is in the current traffic lane region ML. In a case where the angle peak signal in the current process (hereinafter referred to as "current angle peak signal") is in the current traffic lane region ML, the signal processor 18 performs the process of re-pairing. Concretely, in FIG. 17B, angle peak signals Pu1 and Pu2 of a front vehicle Ta exist in a prediction region Su11 defined by a prediction frequency range based on a frequency fu11 and by a prediction angle range based on a prediction angle θe. In a case where the detector 18e detects the previous filtered data set that has continuity with the angle peak signals Pu1 and Pu2 in the current traffic lane region ML, the angle peak signals Pu1 and Pu2 are deemed as the object signals for re-pairing.

On the other hand, an angle peak signal Pu12 of a near vehicle Tb exists in a prediction region Su12 defined by the prediction frequency range based on a frequency fu12 and by the prediction angle range based on a prediction angle (e.g. approx. +4 degrees). However, since the detector 18e does not detect any previous filtered data set that has the continuity with the angle peak signal Pu12 in the current traffic lane region ML, the angle peak signal Pu12 is not deemed as the object signal for re-pairing.

As mentioned above, in a case where the previous filtered data set that has the continuity with the current angle peak signal is detected in the current traffic lane region ML, the signal processor 18 selects a combination including the current angle peak signal as a pair for the history pairing process. Then, in a case where the combination of the angle peak signals does not satisfy a pairing approval condition, the combination becomes as a pair for the process of re-pairing.

In a case where the filtered data set from the previous process that has the continuity with the current angle peak signal exist outside the current traffic lane region ML, the signal processor 18 selects a combination of the current angle peak signals as the combination for the history pairing process. In a case where the combination including the angle peak signal does not satisfy a pairing approval condition, the signal processor 18 does not select the combination as a combination for the process of re-pairing but performs an extrapolation process.

As described above, in order to decide whether or not the position of the target is in the current traffic lane region ML, the signal processor 18 does not use the angle peak signal but uses the previous filtered data set because the process of pairing the angle peak signals has not been completed so that the longitudinal distance and the lateral distance to the target have not been calculated precisely. Therefore, the detector 18e detects whether or not the target is in the current traffic lane region ML by using the filtered data set generated after the previous pairing process.

Figure 18:
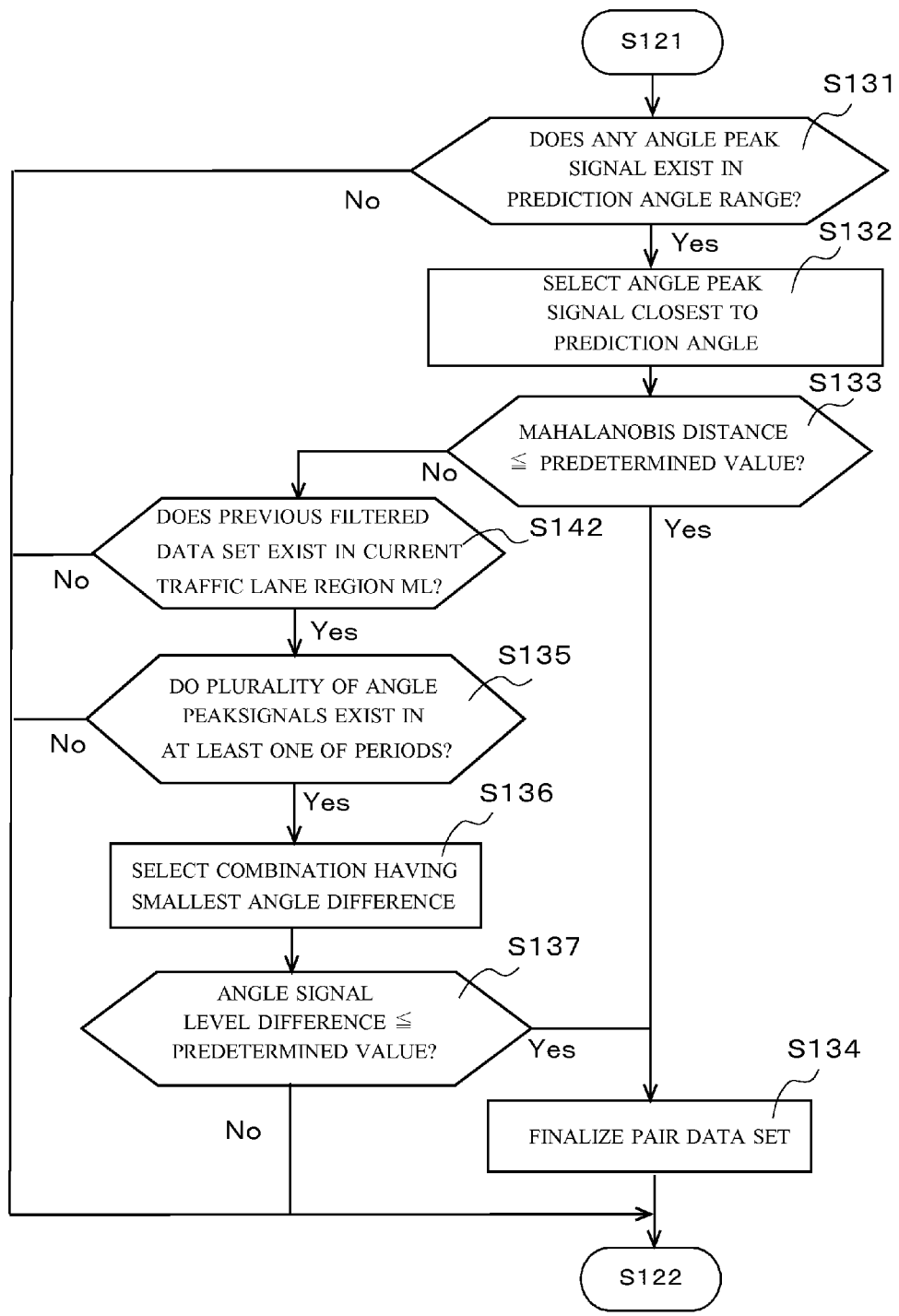
FIG. 18 illustrates a flowchart of a process performed in the third embodiment.

FIG. 18 illustrates a flowchart of the process performed in the third embodiment. When the Mahalanobis distance exceeds a predetermined value (No in the step S133), the signal processor 18 determines whether or not the detector 18e has detected the previous filtered data set in the current traffic lane region ML (a step S142). In other words, the signal processor 18 determines whether or not the previous filtered data set is a most prioritized data set for vehicle control, such as ACC.

In a case where the previous filtered data set is in the current traffic lane region ML (Yes in the step S142), the history pairing part 18d performs of the process of re-pairing a combination different from a combination including the angle peak signal having an angle closest to the prediction angle θe (the steps S135 to S137). Thus, the radar apparatus 10 can reduce the processing load in the derivation of the target information and also can prevent from finalizing a wrong combination as the history pair data set. Moreover, in a case where the previous filtered data set does not exist in the current traffic lane region ML (No in the step S142), the signal processor 18 ends the process and performs the extrapolation process.

Fourth Embodiment

Next a fourth embodiment is explained. A signal processor 18 of a radar apparatus 10 in the fourth embodiment selects only an angle peak signal existing in a range of a current traffic lane defined based on a relative lateral distance, as an object signal for re-pairing in the history pairing process described in the first embodiment.

Concretely, the signal processor 18 obtains a radius value of a curve relating to a current traffic lane RC in which a vehicle CA is traveling, from a vehicle controller 20. The radius value of the curve is derived by the vehicle controller 20 based on a rotation angle of a steering wheel sensor 22. The radius value of the curve may be derived in a different method, for example, based on an image captured by a camera. The signal processor 18 calculates a relative lateral distance of the angle peak signal based on the radius of the curve and selects the angle peak signal of which the relative lateral distance is in the current traffic lane RC, as the object signal for re-pairing.

Herein, there are two types of the lateral distance, one of which is an absolute lateral distance and the other is the relative lateral distance. Given that a transmission axis Ce extends at the lateral distance of ±0 m in a direction in which a transmission wave is transmitted from the radar apparatus 10, the absolute lateral distance is a distance in a direction substantially orthogonal to the transmission axis Ce. The relative lateral distance is a distance in a direction diagonal to an axis generated by curving the transmission axis Ce based on the radius value of the curve (e.g. a reference axis Ce1 in FIG. 20). When deriving the lateral distance, the signal processor 18 derives at least one of the two lateral distances.

In a case where the vehicle CA travels in a traffic lane of which a curve radius is equal to or less than a predetermined value (e.g. 300 m or less), if the signal processor 18 selects all angle peak signals in a prediction region as candidate signals for a combination for re-pairing, an angle peak signal of a near vehicle traveling in a next traffic lane may be included in the candidate signals. As a result, the signal processor 18 may finalize a wrong combination as a history pair data set. In a case where the vehicle CA travels in a traffic lane of which a curve radius is equal to or less than the predetermined value (hereinafter referred to a "curved traffic lane"), the process in the fourth embodiment is performed to exclude the angle peak signals leading to a wrong combination from the object signals for re-pairing.

A structure and the process of the radar apparatus 10 in the fourth embodiment is the same as the structure and the process of the radar apparatus 10 in the first embodiment, except that the signal processor 18 in the fourth embodiment includes an obtaining part 18f and a computing part 18g. However, a history pairing process in the fourth embodiment is partially different. A difference is mainly hereinafter explained with reference to FIG. 19 to FIG. 21. In this embodiment, the process performed in an up period is described as an example. However, the process is also performed for a down period.

Figure 19A:
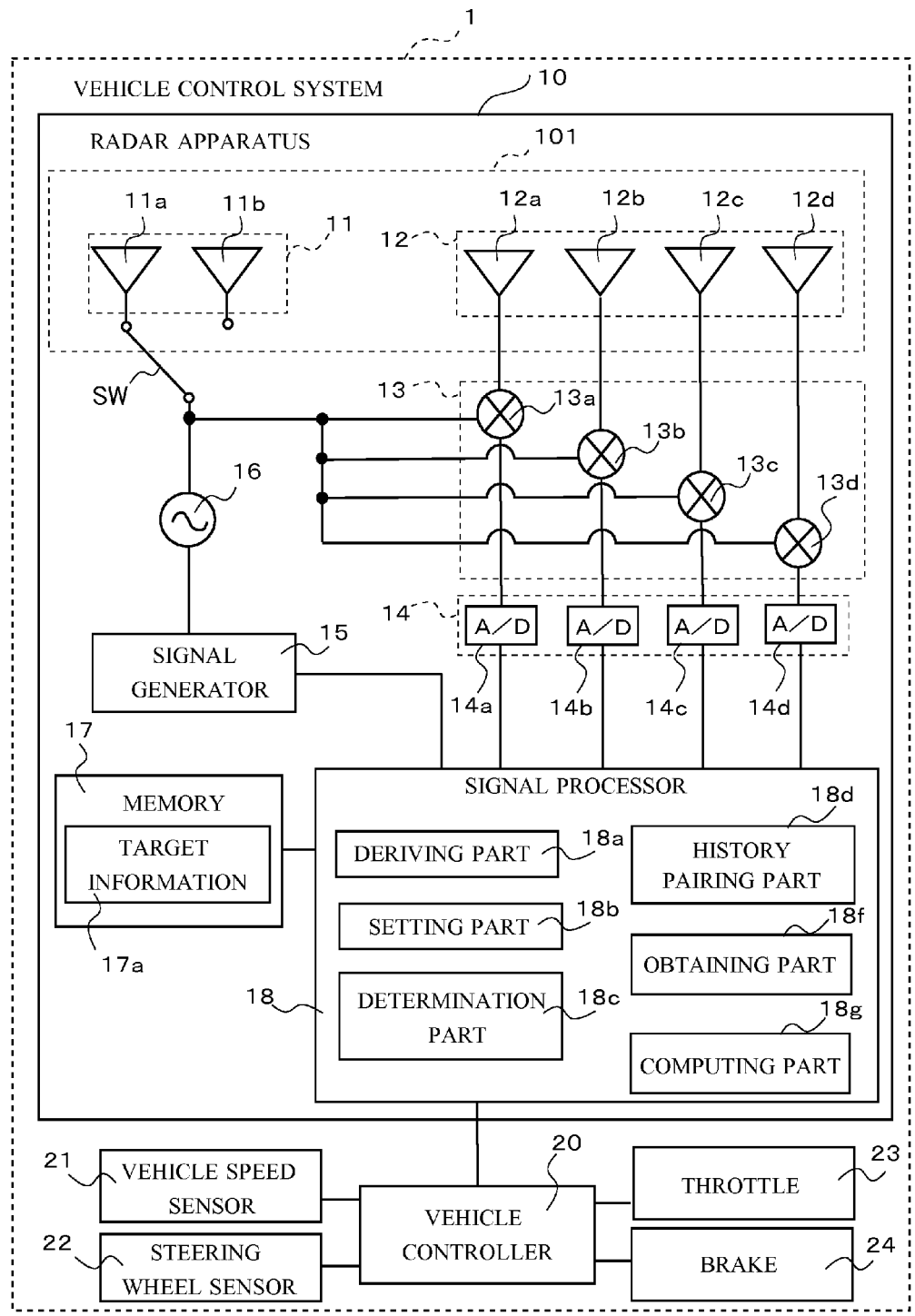
FIG. 19A illustrates a block diagram of a vehicle control system in a fourth embodiment.

FIG. 19A illustrates a block diagram of a vehicle control system 1 in the fourth embodiment. The signal processor 18 of the radar apparatus 10 includes the obtaining part 18f and the computing part 18g. The obtaining part 18f obtains the radius value of the curve of a traffic lane in which the vehicle CA is traveling. The computing part 18g calculates the relative lateral distance for any targets represented by target information based on the obtained radius value of the curve.

Figure 19B:
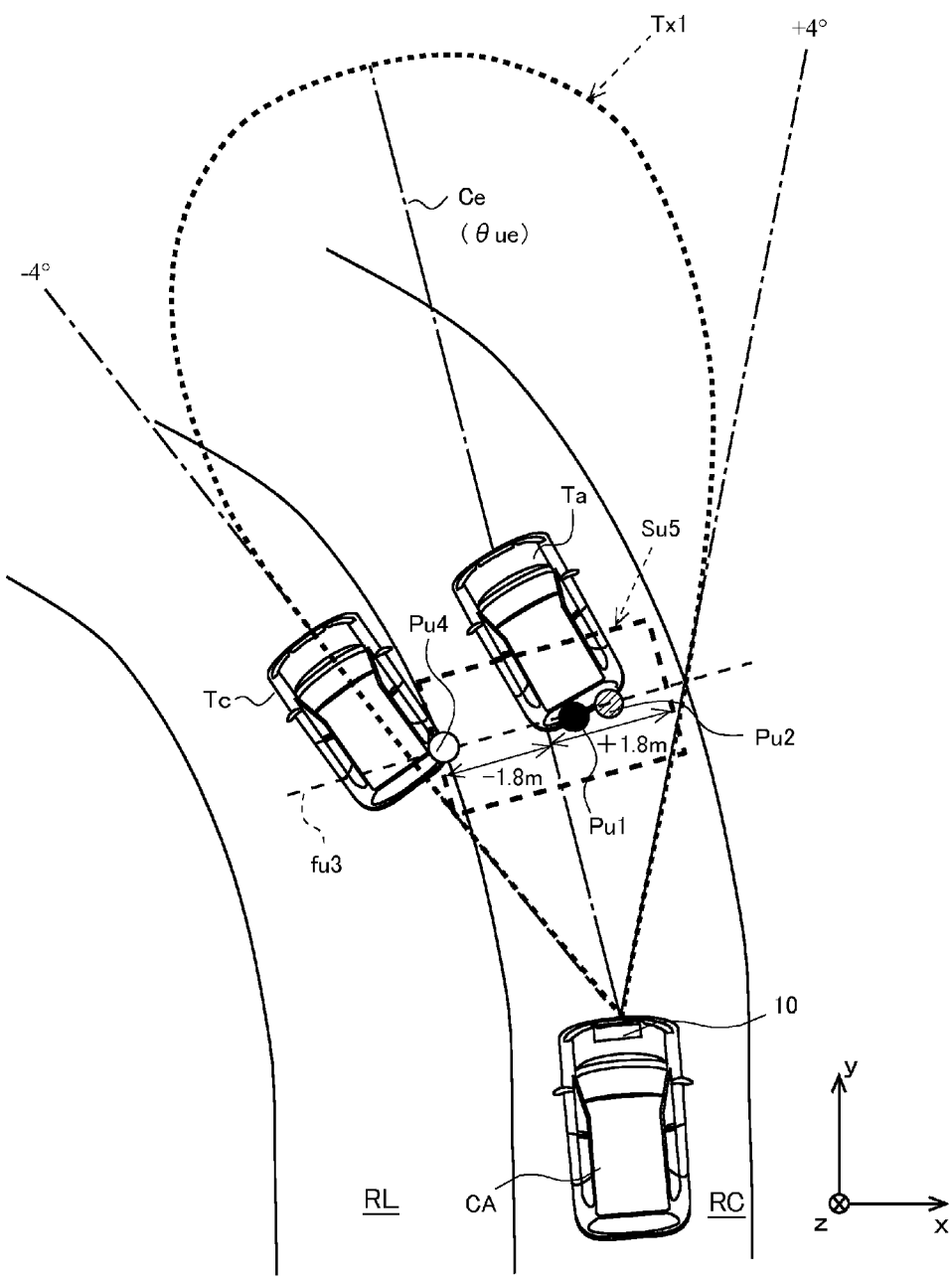
FIG. 19B illustrates a situation where an angle peak signal of a near vehicle is included in a prediction region of a curved traffic lane.

Herein, in a curved traffic lane, a vehicle body of the vehicle CA is inclined to a direction in which a steering wheel of the vehicle CA is rotated. Therefore, the transmission axis Ce of the radar apparatus 10 is also inclined to the direction in which the vehicle body is inclined so that the angle peak signal in the next traffic lane may be included in the prediction region. FIG. 19B illustrates a situation where an angle peak signal Pu4 of a near vehicle Tc is included in a prediction region Su5 of a curved traffic lane. As shown in FIG. 19B, in a case where a candidate for the combination is selected from the prediction region Su5 defined based on the absolute lateral distance, the vehicle body of the vehicle CA is inclined as the steering wheel is rotated at a start of the curve. Accordingly, the transmission axis Ce is inclined to the direction in which the vehicle body is inclined so that the angle peak signal Pu4 of the near vehicle Tc in a left traffic lane RL is included in the prediction region Su5. As a result, the signal processor 18 may select the angle peak signal Pu4 as a candidate for the combination to be processed for re-pairing.

The signal processor 18 in the fourth embodiment selects a candidate for the combination based on a prediction region defined based on the relative lateral distance. The obtaining part 18f obtains the radius value of the curve from the vehicle controller 20. In other words, the obtaining part 18f obtains the radius value of the curve of the traffic lane in which the vehicle CA is traveling. Then the computing part 18g derives the relative lateral distance based on a formula (5) below. In the formula (5), Srd refers to the relative lateral distance and Sad refers to the absolute lateral distance and CR refers to the curve radius. The absolute lateral distance is derived based on the formula (1) mentioned above and an angle of a pair data set, using trigonometric functions. Therefore, the relative lateral distance of a previous filtered data set that has continuity with a current angle peak signal is used as the relative lateral distance of the angle peak signal.

[Formula 5]

$$Srd = Sad - \left(\frac{R^2}{2 \times CR \times 100}\right) \quad (5)$$

Figure 20:
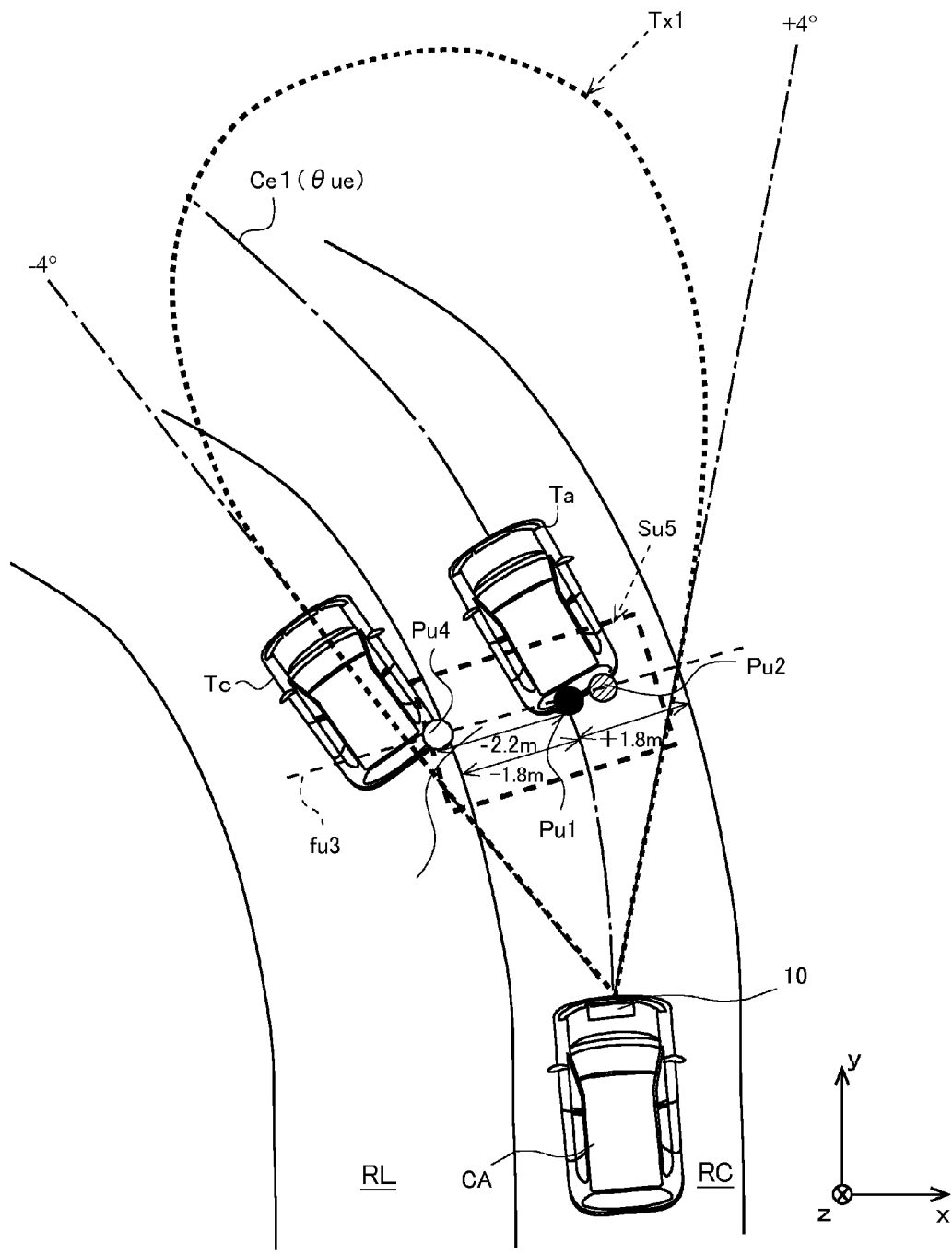
FIG. 20 illustrates a selection of a candidate for a process of re-pairing performed based on a relative lateral distance.

FIG. 20 illustrates selection of the angle peak signal as a candidate for the process of re-pairing performed based on the relative lateral distance. The signal processor 18 selects only the angle peak signals Pu1 and Pu2 in a range of the relative lateral distance of approx. ±1.8 m from the reference axis Ce1 of ±0 m, i.e. approx. 3.6 m, as the candidates for re-pairing from amongst the angle peak signals in the prediction region Su5. In other words, the signal processor 18 does not select, as the candidate for pairing, the angle peak signal Pu4 even in the prediction region Su5 because the angle peak signal Pu4 exists outside the range of the relative lateral distance of −1.8 m (e.g. the relative lateral distance of −2.2 m). Thus, even in a case where the vehicle CA travels in the curved traffic lane, the radar apparatus 10 can select only the angle peak signal existing in the current traffic lane RC in which the vehicle CA is traveling, as the candidate for the combination to be processed for re-pairing.

Figure 21:
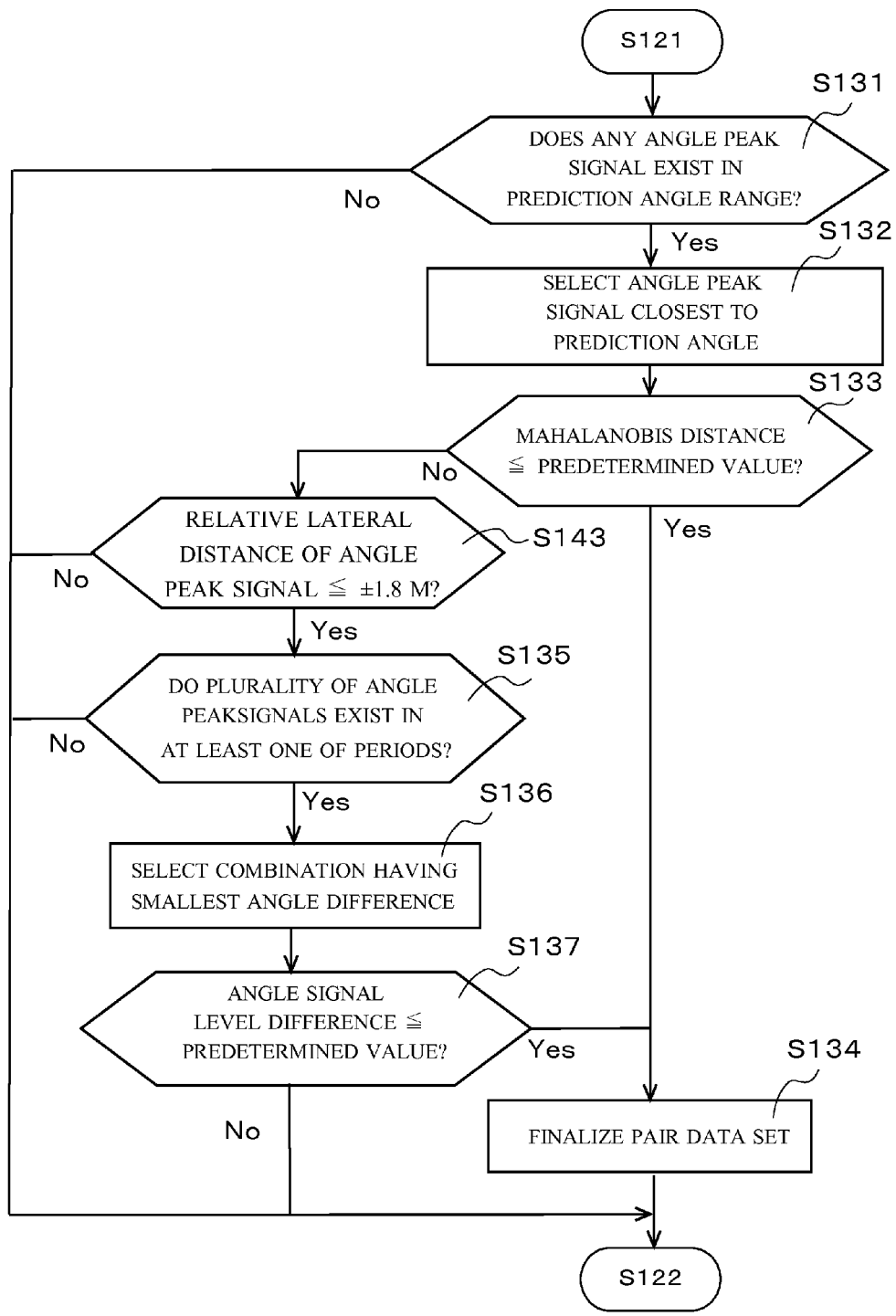
FIG. 21 is a flowchart of a process performed in the fourth embodiment.

FIG. 21 is a flowchart of the process performed in the fourth embodiment. In a case where the Mahalanobis distance exceeds the predetermined value (No in a step S133), the signal processor 18 determines whether or not the relative lateral distance of the angle peak signal of a different candidate is equal to or less than approx. ±1.8 m (a step S143) in each of the up period and the down period. The different candidate is a candidate other than the candidate for the combination of the angle peak signals having angles closest to the prediction angle θe. The different candidate is the angle peak signals existing in the prediction region. In a case where the relative lateral distance of the different candidate is equal to or less than approx. ±1.8 m (Yes in the step S143), processor 18 processes the candidate for re-pairing (from the steps S135 to S137).

Moreover, in a case where the relative lateral distance of the different candidate exceeds approx. ±1.8 m (No in the step S143), the signal processor 18 ends the process and performs the extrapolation process. Thus, in a case where the vehicle CA travels in a curved traffic lane, the radar apparatus 10 can select only the angle peak signal in the current traffic lane RC in which the vehicle is traveling, as a candidate for re-pairing, and can prevent from deriving a wrong combination.

Fifth Embodiment

Next, a fifth embodiment is explained. A signal processor 18 of a radar apparatus 10 in the fifth embodiment pairs an angle peak signal in an up period and an angle peak signal in a down period that have the highest possibility of being associated with a same reflection point, among all possible combination of the angle peak signals in prediction regions in the up period and the down period, in the history pairing process described in the first embodiment. A history pairing process in the fifth embodiment is partially different from the process in the first embodiment. A difference is mainly hereinafter explained with reference to FIG. 22 to FIG. 23.

Figure 22:
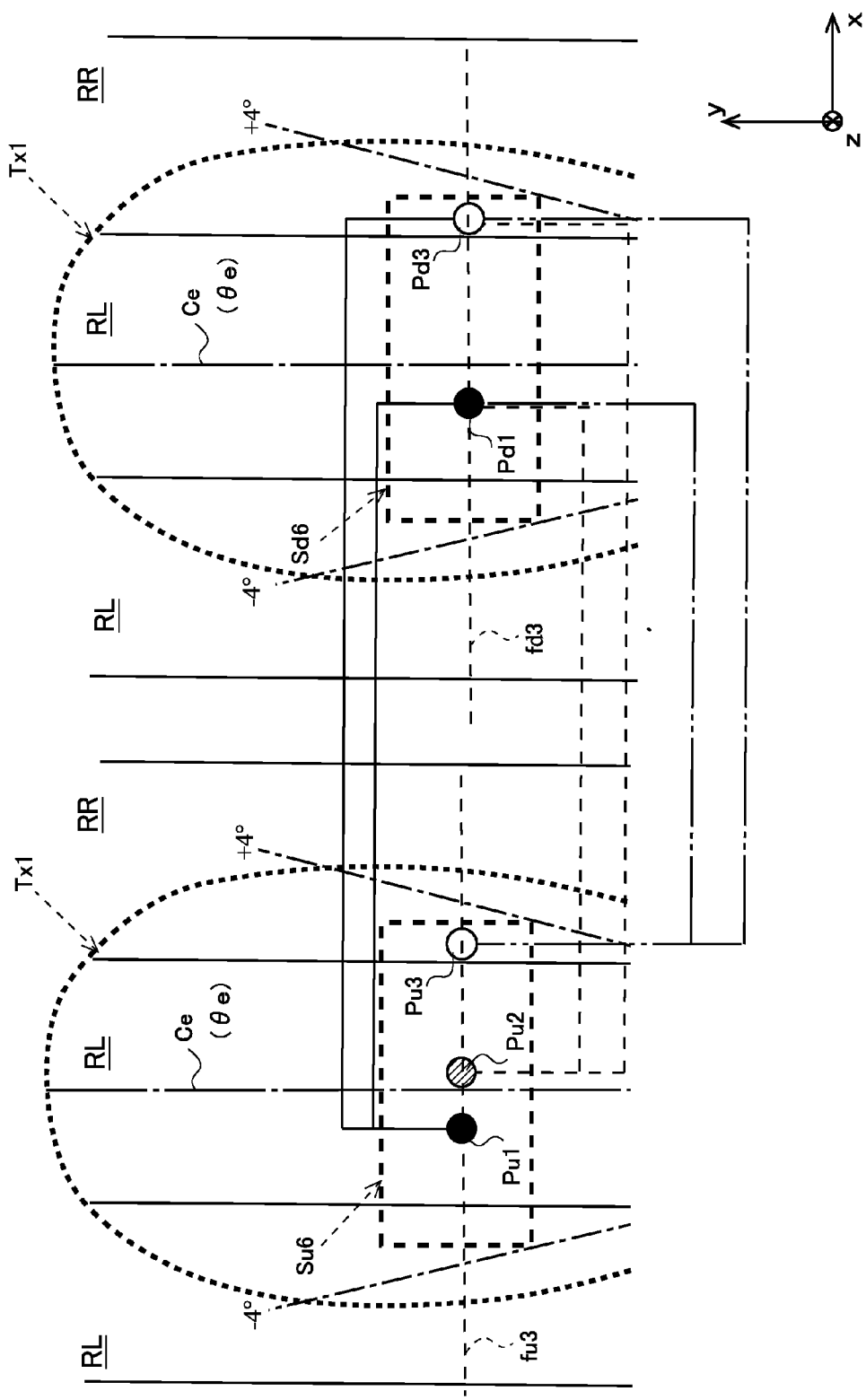
FIG. 22 illustrates candidate combinations of angle peak signals in a prediction region in an up period and angle peak signals in a prediction region in a down period.

FIG. 22 illustrates candidate combinations of angle peak signals in a prediction region Su6 in the up period and angle peak signals in a prediction region Sd6 in the down period. Angle peak signals Pu1, Pu2 and Pu3 in the prediction region Su6 in the up period are generated based on a frequency peak signal of a frequency fu3. Angle peak signals Pd1 and Pd3 in the prediction region Sd6 in the down period are generated based on a frequency peak signal of a frequency fd3. The signal processor 18 performs a pairing process, using the Mahalanobis distance, based on all possible combinations of the angle peak signals Pu1, Pu2 and Pu3 and the angle peak signals Pd1 and Pd3. In this case, the signal processor 18 determines whether or not each of all six combinations satisfies a pairing approval condition.

Figure 23:
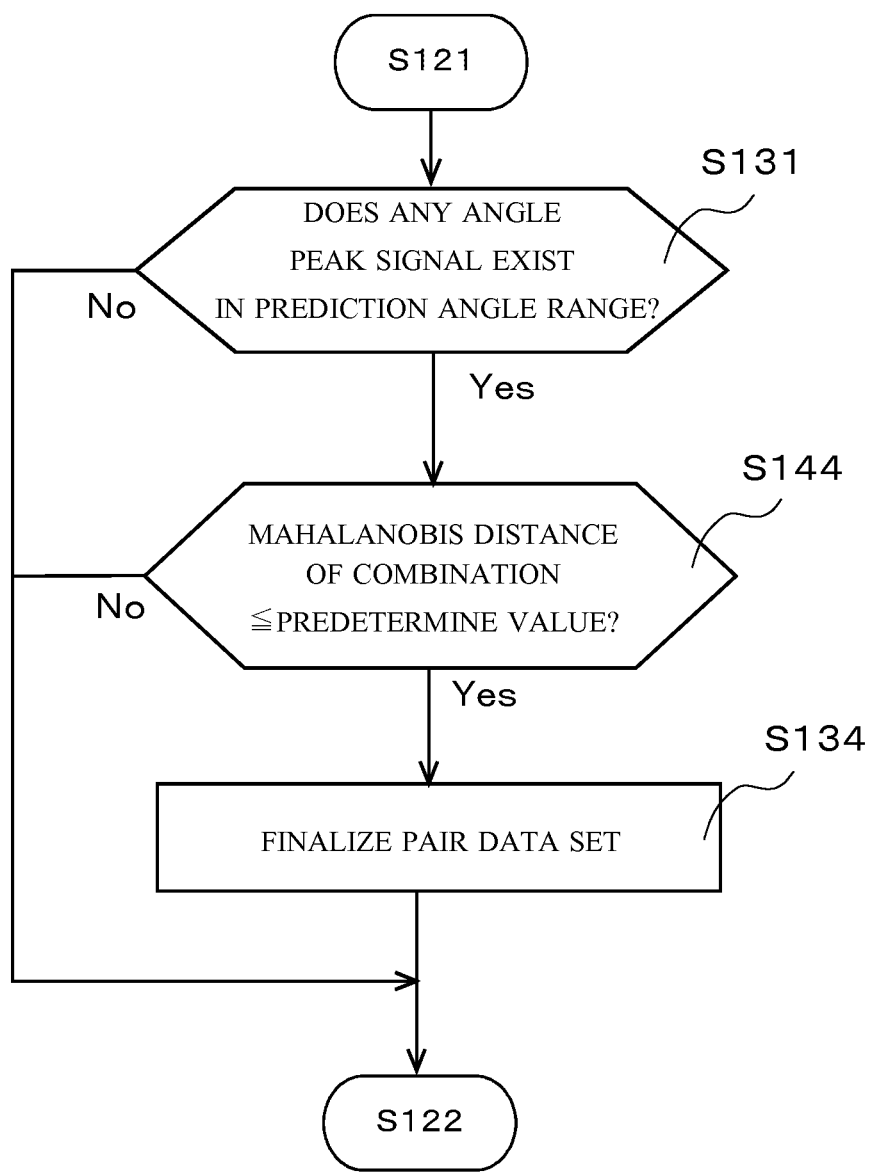
FIG. 23 illustrates a flowchart of a process performed in a fifth embodiment.

FIG. 23 illustrates a flowchart of the process performed in the fifth embodiment. The signal processor 18 determines whether or not the angle peak signal exists in a prediction angle range (approx. ±4 degrees) having a prediction angle θe as a reference, in the up period and the down period (a step S131). In the case where no angle peak signal exists in the prediction angle range in one of the up period and the down period (No in the step S131), the signal processor 18 ends the process without finalizing a history pair data set.

In the case where the angle peak signal exists in the prediction angle ranges (Yes in the step S131), the signal processor 18 determines whether or not a combination having a Mahalanobis distance equal to or less than a predetermine value (e.g. 60 or less) exists among all the possible combinations of all angle peak signals in the up period and all angle peak signals in the down period (a step S144). In a case where the combination having the Mahalanobis distance equal to or less than the predetermined value exists (Yes in the step S144), a history pairing part 18d finalizes the combination as the history pair data set (a step S134). In a case where no combination having the Mahalanobis distance equal to or less than the predetermined value exists (No in the step S144), the history pairing part 18d ends the process. Moreover, in a case where plural combinations having the Mahalanobis distances equal to or less than the predetermined value exist, the history pairing part 18d finalizes the combination having the smallest Mahalanobis distance, as the history pair data set. Thus, even in a case where plural angle peak signals exist in the prediction region, the radar apparatus 10 can surely finalize a correctly-paired combination as the pair data set and can derive an actual position of an target.

Sixth Embodiment

Next, a sixth embodiment is explained. A signal processor 18 of a radar apparatus 10 sets a plurality of areas in a prediction region in the history pairing process described in the first embodiment. In a process of re-pairing, the signal processor 18 selects a possible area for re-pairing from amongst the plurality of areas, based on a position of an angle peak signal in the prediction region.

A structure and a function of the radar apparatus 10 in the sixth embodiment is the same as the structure and the function of the radar apparatus 10 in the first embodiment, except that the signal processor 18 includes a divider 18h. However, a history pairing process in the sixth embodiment is partially different. A difference is mainly hereinafter explained with reference to FIG. 24 to FIG. 25.

Figure 24A:
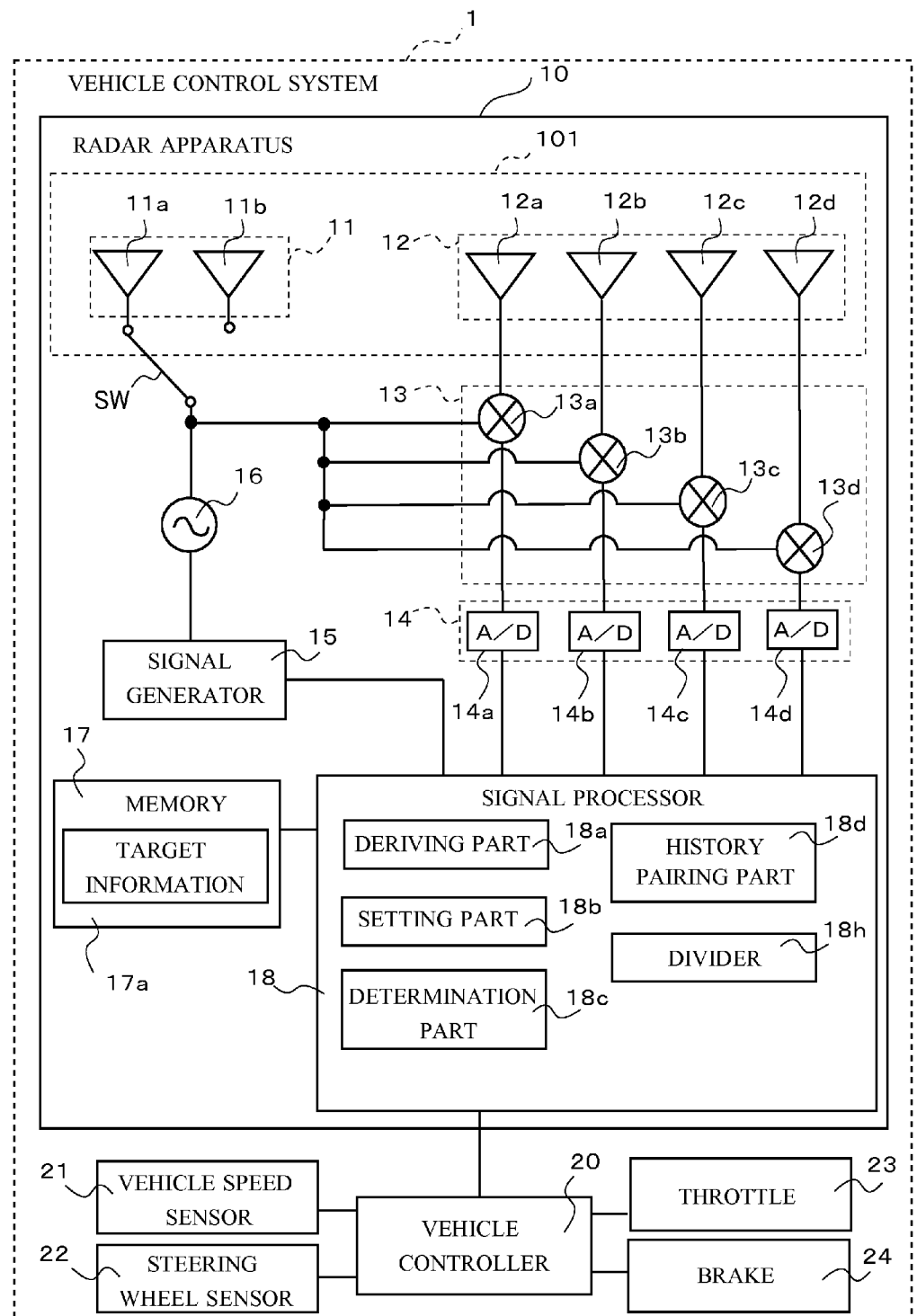
FIG. 24A illustrates a block diagram of a vehicle control system of a sixth embodiment.

FIG. 24A illustrates a block diagram of a vehicle control system 1 of the sixth embodiment. The signal processor 18 of the radar apparatus 10 includes the divider 18h. The divider 18h divides the prediction region into the plurality of areas based on an angle.

Figure 24B:
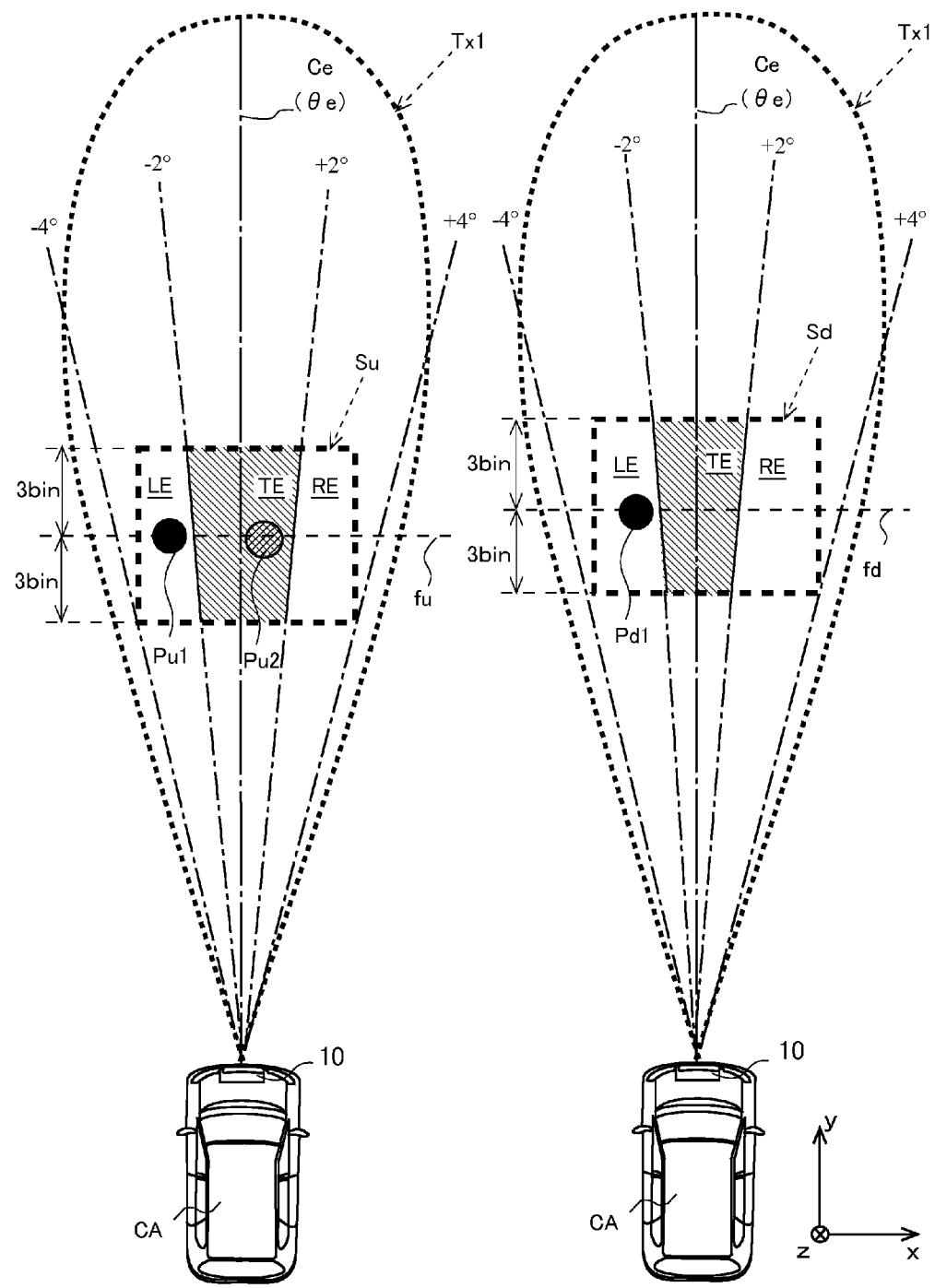
FIG. 24B illustrates a situation where prediction regions in an up period and a down period are divided into a plurality of areas.

FIG. 24B illustrates a situation where the prediction regions in an up period and a down period are divided into the plurality of areas. The divider 18h divides a prediction region Su in the up period and a prediction region Sd in the down period into three areas of a center area TE, a left area LE, and a right area RE, respectively, based on angles. The center area TE, the left area LE and the right area RE are in a same frequency range (approx. ±3 bins) in the prediction region Su (Sd) and are divided based on the angles that are different from one another. Concretely, an angle range of the center area TE is from −2 degrees to +2 degrees. Angle ranges of the left area LE and he right area RE are −2 degrees to −4 degrees and +2 degrees to +4 degrees, respectively.

In a case where the process of re-pairing is performed, the divider 18h divides the prediction region into the plurality of areas. Then, in a case where the angle peak signal exists in the center areas TE in one of the periods, a signal processor 18 selects an angle peak signal in one of the center area TE, the left area LE and the right area RE in the other period as a candidate for a combination with the angle peak signal in the center area TE. Moreover, in a case where the angle peak signal exists in the left area LE in one of the periods, the signal processor 18 selects an angle peak signal in one of the left area LE and the center area TE in the other period as a candidate for a combination with the angle peak signal in the left area LE and does not select an angle peak signal in the right area RE in the other period as the candidate for the combination with the angle peak signal in the left area LE.

Further, in a case where the angle peak signal exists in the right area RE in one of the periods, the signal processor 18 selects an angle peak signal in one of the right area RE and the center area TE in the other period as a candidate for a combination with the angle peak signal in the right area RE but does not select an angle peak signal in the left area LE in the other period as the candidate for the combination with the angle peak signal in the right area RE. In other words, in a case where the angle peak signal exists in one of the left area and the right area in the up period, the signal processor 18 does not select an angle peak signal in the other area of the left area and the right area in the down period as the candidate for the combination with the angle peak signal.

Concretely, as shown in FIG. 24, in a case where a Mahalanobis distance of a combination of angle peak signals Pu2 and Pd1 closest to a prediction angle (θe) in the up period and in the down period, respectively, exceeds a predetermined value, the divider 18h divides the prediction region Su (Sd) into the three areas.

Then, the signal processor 18 selects a candidate combination different from the combination of the angle peak signals Pu2 and Pd1. In other words, the signal processor 18 selects a candidate for the angle peak signal in the down period based on the left area LE in which the angle peak signal Pu1 exists. The signal processor 18 selects the angle peak signal Pd1 in the left area LE of the down period as the candidate for the combination with the angle peak signal Pu1. Then in a case where an angle signal level of the combination of the angle peak signals Pu1 and Pd1 is equal to or less than the predetermined value, the history pairing part 18d finalizes the combination as the history pair data set.

In a case where a different angle peak signal exists in the center area TE in the down period, the different angle peak signal is also a candidate for the combination with the angle peak signal Pu1. The signal processor 18 finalizes the combination of the angle peak signal having a smaller angle signal level difference from the angle peak signal Pu1, as the history pair data set. In a case where a different angle peak signal exists in the right area RE in the down period, the signal processor 18 does not select the different angle peak signal as a candidate for the combination with the angle peak signal Pu1. As described above, the radar apparatus 10 excludes a combination of the angle peak signals of which angles are greatly different from each other, from object signals for pairing. Therefore, the radar apparatus 10 can finalize, as the pair data set, a combination of the angle peak signals that have the highest possibility of being associated with a same reflection point.

Figure 25:
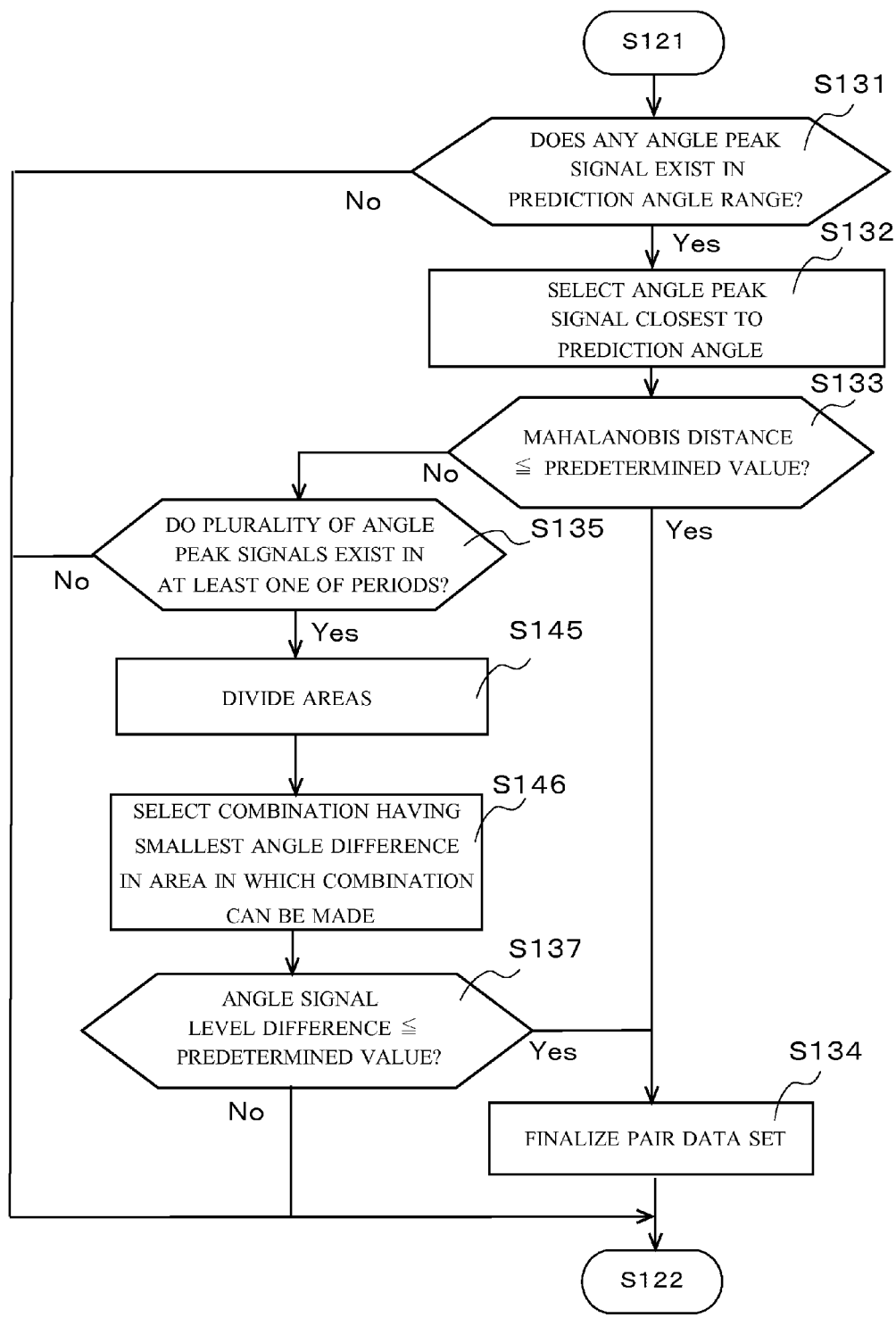
FIG. 25 illustrates a flowchart of a process performed in a sixth embodiment.

FIG. 25 illustrates a flowchart of the process performed in the sixth embodiment. In the case where the Mahalanobis distance exceeds the predetermined value (No in a step S133), the determination part 18c determines whether or not a plurality of angle peak signals exist in at least one of the up period and the down period in a process of re-pairing (a step S135). In the a where the plurality of angle peak signals exist in at least one of the periods (Yes in the step S135), the divider 18h divides the prediction region Su (Sd) into the plurality of areas (the center area TE, the left area LE and the right area RE) based on angles (a step S145).

Then, the signal processor 18 selects a combination having the smallest angle difference between the angle peak signals in the up period and the down period, from amongst the angle peak signals in the areas in which a combination can be made (a step S146). In a case where the angle signal level difference is equal to or less than the predetermined value (Yes in a step S137), the history pairing part 18d finalizes the combination as the pair data set. Thus, the radar apparatus 10 can exclude the combination of the angle peak signals in a relatively long lateral distance and can finalize the combination of the angle peak signals in a relatively short distance in the lateral direction as the history pair data set.

Number of the plurality of divided areas of the prediction region in the embodiment is an example. The divided areas may be other than three (e.g. four). Moreover, angles used to divide the prediction region may be different from the angles used in the embodiment.

<4. Modifications>

The embodiments of the invention are described above. However, the invention is not limited to the foregoing embodiments but various modifications are possible. Such a modification is hereinafter described. All the forms including the foregoing embodiments and the modifications described below may be arbitrarily combined.

Numbers of the transmitting antenna 11 and the receiving antenna 12 are two and four, respectively, in the embodiments. However, the numbers of the transmitting antenna 11 and the receiving antenna 12 may be different from those numbers mentioned above.

In the foregoing embodiments, the transmission ranges Tr1 and Tr2 are explained by showing the concrete angles based on the transmission axis Ce of ±0 degree. However, those angles are examples and different angles may be used to define the ranges.

In the foregoing embodiments, the longitudinal distance to the target is explained as the distance from the target to the point where the reflection wave reflected by the target is received by the receiving antenna 12. However, the longitudinal distance of a target existing at an angle other than the transmission axis Ce (±0 degree) may be defined as a distance on the transmission axis Ce (±0 degree) derived by using trigonometric functions of an angle of the target and the distance from the target to the point where the reflection wave reflected by the target is received by the receiving antenna 12.

Moreover, in the foregoing embodiments, the current process and the previous process are explained as the temporally consecutive processes. On the other hand, the previous process may include one or more past consecutive processes that have been performed before the previous process (e.g. two processes before the current process).

In the foregoing embodiment, ESPRIT is used by the radar apparatus 10 to estimate an angle. However, ESPRIT is an example and one of other methods, such as digital beam forming (DFB), propagator method based on an improved spatial-smoothing matrix (PRISM) and multiple signal classification (MUSIC) may be used.

Further, the radar apparatus 10 in the foregoing embodiments may be used for equipment other than the vehicle CA. For example, the radar apparatus 10 may be used for airplanes, ships, etc.

In the foregoing embodiment, the various functions are implemented by software using the CPU executing the arithmetic processing in accordance with the program. However, a part of the functions may be implemented by an electrical hardware circuit. Contrarily, a part of functions executed by hardware may be implemented by software.

While the invention has been shown and described in detail, the foregoing description is in all aspects illustrative and not restrictive. It is therefore understood that numerous other modifications and variations can be devised without departing from the scope of the invention.

What is claimed is:

1. A radar apparatus that is installed on a vehicle and that is configured to receive a reflection wave reflected by a target and to derive a position of the target, the radar apparatus comprising a signal processor configured to:
    derive a prediction peak signal in each of an up period in which a frequency of a transmission signal increases and in a down period in which the frequency of the transmission signal decreases, the frequency of the transmission signal changing in a predetermined cycle;
    set a prediction region having a predetermined range defined based on a prediction position of an angle peak signal, in each of the up period and the down period based on the prediction peak signal;
    determine whether or not a plurality of the angle peak signals exist in the prediction region in at least one of the up period and the down period; and
    (i) in a case where a first angle peak signal closest to the prediction position in the up period and a second angle peak signal closest to the prediction position in the down period satisfy a pairing condition, finalize a combination of the first angle peak signal and the second angle peak signal as a pair data set, and (ii) in a case where the combination of the first angle peak signal and the second angle peak signal does not satisfy the pairing condition, where the plurality of angle peak signals exist in the prediction region in at least one of the up period and the down period and where a different combination from the combination of the first angle peak signal and the second angle peak signal satisfies a re-pairing condition, finalize the different combination as the pair data set.

2. The radar apparatus according to claim 1, wherein
    the pairing condition is that a Mahalanobis distance based on the first angle peak signal and the second angle peak signal is equal to or less than a predetermined value, and
    the re-pairing condition is that an angle difference of two angle peak signals of the different combination is a smallest difference and that a signal level difference between the two angle peak signals of the different combination is equal to or less than a predetermined value.

3. The radar apparatus according to claim 1, wherein the signal processor is further configured to, when (i) is not satisfied:
    determine whether or not the combination of the first angle peak signal and the second angle peak signal exists in a short distance range that is a range in a relatively short distance from the vehicle, in a current traffic lane region that is a range of a current traffic lane in which the vehicle is traveling, and wherein
    in a case where the combination of the first angle peak signal and the second angle peak signal exists in the current traffic lane region, and (ii) is satisfied, the signal processor finalizes the different combination as the pair data set.

4. The radar apparatus according to claim 1, wherein
    the signal processor is configured to reduce an angle range of the prediction region as a longitudinal distance of the angle peak signal becomes greater.

5. The radar apparatus according to claim 1, wherein the signal processor is further configured to, when (i) is not satisfied:
    obtain a curve radius of a traffic lane in which the vehicle is traveling; and
    calculate a relative lateral distance of the angle peak signal based on the curve radius, wherein the signal processor finalizes, based on the relative lateral distance, the different combination existing in the current traffic lane as the pair data set when (ii) is satisfied.

6. The radar apparatus according to claim 1, wherein the signal processor is further configured to, when (i) is not satisfied:
   divide the prediction region into a plurality of areas based on an angle, wherein
   the signal processor finalizes the different combination satisfying (ii) and existing in one of the plurality of areas, as the pair data set.

7. The radar apparatus according to claim 1, wherein
   in a case where (i) is satisfied and a plurality of candidate data pairs exist in the prediction region in at least one of the up period and the down period, the signal processor finalizes as the pair data set, one of the candidate data pairs that has the highest possibility of being associated with a same reflection point.

8. A vehicle control system that controls a vehicle, the vehicle control system comprising:
   the radar apparatus according to claim 1; and
   a vehicle controller that is configured to control the vehicle based on the position of the target derived by the radar apparatus.

9. The vehicle control system according to claim 8, wherein
   the vehicle controller is configured to maintain a following distance between the vehicle and the target based on the position of the target derived by the radar apparatus.

10. A signal processing method performed by a signal processor of a radar apparatus that is installed on a vehicle and that receives a reflection wave reflected by a target and derives a position of the target, the signal processing method comprising the steps of:
    (a) deriving a prediction peak signal in each of an up period in which a frequency of a transmission signal increases and in a down period in which the frequency of the transmission signal decreases, the frequency of the transmission signal changing in a predetermined cycle;
    (b) setting a prediction region having a predetermined range defined based on a prediction position of an angle peak signal, in each of the up period and the down period based on the prediction peak signal;
    (c) determining whether or not a plurality of the angle peak signals exist in the prediction region in at least one of the up period and the down period; and
    (d) (i) in a case where a first angle peak signal closest to the prediction position in the up period and a second angle peak signal closest to the prediction position in the down period satisfy a pairing condition, finalizing a combination of the first angle peak signal and the second angle peak signal as a pair data set, and (ii) in a case where the combination of the first angle peak signal and the second angle peak signal does not satisfy the pairing condition, where the plurality of angle peak signals exist in the prediction region in at least one of the up period and the down period and where a different combination from the combination of the first angle peak signal and the second angle peak signal satisfies a re-pairing condition, finalizing the different combination as the pair data set.

11. The signal processing method according to claim 10, wherein
    the pairing condition is that a Mahalanobis distance based on the first angle peak signal and the second angle peak signal is equal to or less than a predetermined value, and
    the re-pairing condition is that an angle difference of two angle peak signals of the different combination is a smallest difference and that a signal level difference between the two angle peak signals of the different combination is equal to or less than a predetermined value.

12. A vehicle control method comprising:
    controlling a vehicle based on the position of the target derived by the method according to claim 10.

13. The vehicle control method according to claim 12, wherein
    the step of controlling the vehicle includes maintaining a following distance between the vehicle and the target.

* * * * *